United States Patent
Wen et al.

(10) Patent No.: US 12,300,142 B2
(45) Date of Patent: May 13, 2025

(54) SMART ALGORITHM FOR SEAMLESS TRANSITION WITH UNDER DISPLAY FINGERPRINT SENSORS

(71) Applicant: Google LLC, Mountain View, CA (US)

(72) Inventors: Chien-Hui Wen, Cupertino, CA (US); Hsin-Yu Chen, Taoyuan (TW)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/293,504

(22) PCT Filed: Jul. 30, 2021

(86) PCT No.: PCT/US2021/043860
§ 371 (c)(1),
(2) Date: Jan. 30, 2024

(87) PCT Pub. No.: WO2023/009136
PCT Pub. Date: Feb. 2, 2023

(65) Prior Publication Data
US 2024/0221575 A1    Jul. 4, 2024

(51) Int. Cl.
*G09G 3/20* (2006.01)
*G06V 40/12* (2022.01)

(52) U.S. Cl.
CPC ........... *G09G 3/2007* (2013.01); *G06V 40/12* (2022.01); *G09G 2320/0247* (2013.01);
(Continued)

(58) Field of Classification Search
CPC ...... G06F 21/32; G06V 40/12; G09G 3/2007; G09G 5/10; G09G 2320/0242;
(Continued)

(56) References Cited

U.S. PATENT DOCUMENTS 6,064,382 A    5/2000   Diedrich et al.
6,862,022 B2   3/2005   Slupe
(Continued)

FOREIGN PATENT DOCUMENTS

CN   102812509 B   3/2016
CN   105895051 A   8/2016
(Continued)

OTHER PUBLICATIONS

International Searching Authority, International Search Report and Written Opinion, mailed Apr. 26, 2022, issued in connection with International Patent Application No. PCT/US2021/043860, filed Jul. 30, 2021, 14 pages.
(Continued)

*Primary Examiner* — Mihir K Rayan
(74) *Attorney, Agent, or Firm* — McDonnell Boehnen Hulbert & Berghoff LLP

(57) ABSTRACT

An example method includes determining, for a device having a display component configured to operate at multiple brightness levels and for a range of DBVs, a gamma value offset to a default gamma value at the second brightness level. The method includes determining, for a tap point representative of the range, a brightness value offset to a default brightness value at the second brightness level. The method includes storing the gamma value offset and the brightness value offset. Subsequent to the storing, the device is configured to transition, in response to a fingerprint authentication triggering event, the display component from a first brightness level to a second brightness level by: overriding a default gamma value based on the gamma value offset, and displaying a portion of the display component by applying a value offset to a default brightness value at the second brightness level based on the brightness value offset.

20 Claims, 12 Drawing Sheets

(52) U.S. Cl.
CPC .......... G09G 2320/0626 (2013.01); G09G 2320/0673 (2013.01); G09G 2320/0686 (2013.01); G09G 2354/00 (2013.01); G09G 2360/144 (2013.01)

(58) Field of Classification Search
CPC ... G09G 2320/0247; G09G 2320/0276; G09G 2320/0626; G09G 2320/064; G09G 2320/0673; G09G 2320/0686; G09G 2354/00; G09G 2360/144
See application file for complete search history.

(56) References Cited

U.S. PATENT DOCUMENTS

| | | | |
|---|---|---|---|
| 9,361,856 | B2 | 6/2016 | Jiang |
| 9,501,993 | B2 | 11/2016 | Nambi et al. |
| 9,620,064 | B2 | 4/2017 | Albrecht et al. |
| 9,847,056 | B2 | 12/2017 | Shimizu et al. |
| 10,068,551 | B1 | 9/2018 | Choi et al. |
| 11,189,222 | B1 | 11/2021 | Aogaki et al. |
| 11,854,452 | B2 | 12/2023 | Wen et al. |
| 2002/0051121 | A1 | 5/2002 | Kanai |
| 2003/0001810 | A1 | 1/2003 | Yamaguchi et al. |
| 2003/0016215 | A1 | 1/2003 | Slupe |
| 2006/0146008 | A1 | 7/2006 | Johnson et al. |
| 2007/0285576 | A1* | 12/2007 | Moore ............ H04N 5/202 348/E5.074 |
| 2008/0117142 | A1 | 5/2008 | Lin et al. |
| 2009/0058763 | A1 | 3/2009 | Doi et al. |
| 2010/0182332 | A1* | 7/2010 | Ozawa ............ G06F 1/3265 345/694 |
| 2012/0056911 | A1 | 3/2012 | Safaee-Rad et al. |
| 2013/0147857 | A1 | 6/2013 | Kurikko |
| 2014/0125618 | A1 | 5/2014 | Panther et al. |
| 2014/0198093 | A1 | 7/2014 | Nambi et al. |
| 2014/0267370 | A1 | 9/2014 | Albrecht et al. |
| 2014/0267448 | A1 | 9/2014 | Albrecht et al. |
| 2016/0042708 | A1 | 2/2016 | Wang et al. |
| 2016/0093248 | A1 | 3/2016 | Shimizu et al. |
| 2016/0173862 | A1 | 6/2016 | Huang et al. |
| 2016/0307523 | A1 | 10/2016 | Huang et al. |
| 2017/0124934 | A1 | 5/2017 | Verbeure et al. |
| 2017/0206859 | A1 | 7/2017 | Jun et al. |
| 2017/0243548 | A1 | 8/2017 | Wang et al. |
| 2018/0090084 | A1 | 3/2018 | Zheng et al. |
| 2018/0254010 | A1 | 9/2018 | Kitada et al. |
| 2019/0035366 | A1 | 1/2019 | Li et al. |
| 2019/0087620 | A1* | 3/2019 | Kim ............ G06V 40/1318 |
| 2019/0102597 | A1 | 4/2019 | Lu et al. |
| 2019/0116304 | A1 | 4/2019 | Hasinoff et al. |
| 2019/0156786 | A1 | 5/2019 | Aogaki et al. |
| 2019/0180695 | A1 | 6/2019 | Ha et al. |
| 2019/0278967 | A1 | 9/2019 | Shepelev et al. |
| 2020/0035202 | A1 | 1/2020 | Aflatooni et al. |
| 2020/0082791 | A1 | 3/2020 | Petrie |
| 2020/0160792 | A1 | 5/2020 | Park et al. |
| 2020/0160814 | A1 | 5/2020 | Han et al. |
| 2020/0175246 | A1 | 6/2020 | Park |
| 2020/0211442 | A1 | 7/2020 | Kim et al. |
| 2020/0242321 | A1 | 7/2020 | Cao et al. |
| 2020/0265769 | A1 | 8/2020 | Pyo et al. |
| 2020/0286431 | A1 | 9/2020 | Sugiyama et al. |
| 2020/0394945 | A1 | 12/2020 | Shin |
| 2021/0012717 | A1* | 1/2021 | Park ............ G09G 3/20 |
| 2021/0027745 | A1* | 1/2021 | Bai ............ G09G 5/10 |
| 2021/0056281 | A1 | 2/2021 | Shih et al. |
| 2021/0097943 | A1 | 4/2021 | Wyatt |
| 2021/0225324 | A1 | 7/2021 | Furihata et al. |
| 2023/0343267 | A1* | 10/2023 | Wen ............ G06F 3/04847 |

FOREIGN PATENT DOCUMENTS

| | | |
|---|---|---|
| CN | 105103214 B | 6/2018 |
| CN | 106875925 B | 4/2019 |
| CN | 107274833 B | 7/2019 |
| CN | 110086961 A | 8/2019 |
| CN | 109686307 B | 6/2020 |
| CN | 107591119 B | 8/2020 |
| CN | 110276326 B | 7/2021 |
| CN | 110473500 B | 7/2021 |
| CN | 111916032 B | 6/2023 |
| EP | 1220193 B1 | 3/2004 |
| EP | 2469505 B1 | 2/2019 |
| GB | 2562536 B | 7/2022 |
| JP | 2002215106 A | 7/2002 |
| JP | 2003005736 A | 1/2003 |
| JP | 2004355405 A | 12/2004 |
| JP | 2005352412 A | 12/2005 |
| JP | 2006030559 A | 2/2006 |
| JP | 2006330292 A | 12/2006 |
| JP | 2008287702 A | 11/2008 |
| JP | 2009058675 A | 3/2009 |
| JP | 2010097097 A | 4/2010 |
| JP | 2010130102 A | 6/2010 |
| JP | 2014519045 A | 8/2014 |
| JP | 2015049567 A | 3/2015 |
| JP | 2015191039 A | 11/2015 |
| JP | 2017049319 A | 3/2017 |
| JP | 2019511856 A | 4/2019 |
| JP | 2020144256 A | 9/2020 |
| KR | 20110030212 A | 3/2011 |
| KR | 20140108780 A | 9/2014 |
| KR | 20190047790 A | 5/2019 |
| KR | 20190079488 A | 7/2019 |
| KR | 20200074522 | 6/2020 |
| KR | 20200081859 A | 7/2020 |
| TW | 201246165 A | 11/2012 |
| TW | 108146469 | 12/2019 |
| WO | 2014188789 A1 | 11/2014 |
| WO | 2018211287 | 11/2018 |
| WO | 2019183786 A1 | 10/2019 |
| WO | 2021066837 A1 | 4/2021 |
| WO | 2022159114 A1 | 7/2022 |

OTHER PUBLICATIONS

Choi, Sangmoo, "Clock Trace Structure for Block Sequential Clock Driving," Technical Disclosure Commons, Dec. 2021, 11 pages.

International Property India, First Examination Report mailed on Sep. 2, 2024, issued in connection with Indian Patent Application No. 202347036535, 7 pages.

International Property India, First Examination Report mailed on Apr. 13, 2023, issued in connection with Indian Patent Application No. 20234700173, 5 pages.

International Property India, First Examination Report mailed on Aug. 30, 2022, issued in connection with Indian Patent Application No. 202247020277, 8 pages.

International Searching Authority, International Search Report and Written Opinion mailed Oct. 15, 2021, issued in connection with International Patent Application No. PCT/US2021/014902, filed Jan. 25, 2021, 22 pages.

International Searching Authority, International Search Report and Written Opinion mailed Jul. 29, 2022, issued in connection with International Patent Application No. PCT/US2021/073067, filed Dec. 22, 2021, 25 pages.

International Searching Authority, International Search Report and Written Opinion mailed on Jan. 7, 2022, issued in connection with International Patent Application No. PCT/US2021/026838, filed Apr. 12, 2021, 26 pages.

International Searching Authority, International Search Report and Written Opinion mailed Sep. 8, 2021, issued in connection with International Patent Application No. PCT/US2021/033978, filed on May 25, 2021, 15 pages.

International Searching Authority, International Search Report and Written Opinion mailed Dec. 17, 2019, issued in connection with International Patent Application No. PCT/US2019/054674 filed Oct. 4, 2019, 14 pages.

International Searching Authority, International Search Report and Written Opinion mailed Sep. 14, 2021, issued in connection with International Patent Application No. PCT/US2020/060413, filed Nov. 13, 2020, 23 pages.

(56) References Cited

OTHER PUBLICATIONS

Japanese Patent Office, Office Action mailed Jun. 25, 2024, issued in connection with Japanese Patent Application No. 2023-528515, 13 pages (with Eng. Translation).
Japanese Patent Office, Office Action mailed Jul. 23, 2024, issued in connection with Japanese Patent Application No. 2023-562559, 5 pages (with English Translation).
Korean Patent Office, Office Action mailed on Sep. 19, 2023, issued in connection with Korean Patent Application No. 1020227000850, 10 pages.
Korean Patent Office, Office Action mailed on Aug. 13, 2024, issued in connection with Korean Patent Application No. 1020237019188, 84 pages.

\* cited by examiner

| Brightness Range (DBV in Hex) | Brightness Range (nits) | Algo (Regamma) | DBV Offset | DBV set at Lab test Normal/LHBM ON | |
|---|---|---|---|---|---|
| ≥ 199 | > 100 nits | no | 84.3% of LHBM OFF | @250 nits 3FF / 35F | ← 5R1 |
| 147 – 198 | 80 – 99 nits | Algo43 | 95% of LHBM OFF | @80 nits 0 x 147/136 | ← 5R2 |
| 0CC – 146 nits | 50 – 79 nits | Algo43 | 93% of LHBM OFF | @50 nits 0 x 0CC/BD | ← 5R3 |
| ≤ 0CC | ≤ 50 nits | Algo41 | 95% of LHBM OFF | @25 nits 0 x 066/060 | ← 5R4 |

Figure 5

| Initial Gamma | Regamma Curve |
|---|---|
| 0 | 0 |
| 64 | 64 |
| 128 | 128 |
| 192 | 192 |
| 256 | 256 |
| 320 | 320 |
| 384 | 368 |
| 448 | 432 |
| 512 | 496 |
| 576 | 560 |
| 640 | 624 |
| 704 | 688 |
| 768 | 736 |
| 832 | 800 |
| 896 | 864 |
| 960 | 928 |
| 1024 | 976 |
| 1088 | 1040 |
| 1152 | 1104 |
| 1216 | 1152 |
| 1280 | 1232 |
| 1344 | 1280 |
| 1408 | 1344 |
| 1472 | 1408 |
| 1536 | 1472 |
| 1600 | 1536 |
| 1664 | 1600 |
| 1728 | 1648 |
| 1792 | 1712 |
| 1856 | 1776 |
| 1920 | 1840 |
| 1984 | 1904 |

Figure 7

SMART ALGORITHM FOR SEAMLESS TRANSITION WITH UNDER DISPLAY FINGERPRINT SENSORS

This application is a national stage application under 35 U.S.C. § 371 of International Application No. PCT/US2021/043860, filed Jul. 30, 2021, the disclosure of which is explicitly incorporated by reference herein in its entirety.

BACKGROUND

A display brightness level may refer to a perceived intensity of light emanating from a display screen of a computing device. A display brightness mode may refer to a range of brightness levels. For example, a normal mode may correspond to a brightness level from 0-500 candela per square meter, and a high brightness mode may correspond to a brightness level from 800-900 candela per square meter. Different brightness levels may require different power usage, and lead to differing user experiences. Sometimes, a computing device can transition between multiple brightness modes for the display screen.

SUMMARY

The present disclosure generally relates to a display component of a computing device. The display component may be configured to operate at multiple brightness levels. Depending on one or more triggering events, a controller of the computing device may transition the display component from a first brightness level to a second brightness level. For example, when authenticating a fingerprint using the display screen, the computing device may transition from a normal mode to a high brightness mode, and after an authentication is performed, the computing device may transition back to normal mode. Brightness of different portions of the display component may be adjusted when authenticating the fingerprint.

In a first aspect, a computer-implemented method is provided. The method includes determining, for a device having a display component configured to operate at first and second brightness levels and for a display brightness value (DBV) band representative of a range of DBVs, a gamma value offset to a default gamma value used by the device for the DBV band at the second brightness level, wherein the gamma value offset is determined to maintain consistency of measured relative luminance for the first and second brightness levels. The method also includes determining, for a tap point representative of the range, a brightness value offset to a default brightness value for the tap point at the second brightness level, wherein the brightness value offset is determined to maintain consistency of measured gamma corrected luminance values for the first and second brightness levels after the gamma value offset is applied. The method further includes storing, at the device and for the range, the gamma value offset and the brightness value offset, wherein subsequent to the storing, the device is configured to transition, in response to a fingerprint authentication triggering event, the display component from the first brightness level to the second brightness level by: overriding a default gamma value for an input gray level corresponding to the range based on the gamma value offset, and displaying a portion of the display component by applying, to the portion and for the input gray level, a value offset to a default brightness value at the second brightness level based on the brightness value offset, wherein the portion is different from a fingerprint authentication portion.

In a second aspect, a system is provided. The system may include one or more processors. The system may also include data storage, where the data storage has stored thereon computer-executable instructions that, when executed by the one or more processors, cause the system to carry out operations. The operations may include determining, for a device having a display component configured to operate at first and second brightness levels and for a display brightness value (DBV) band representative of a range of DBVs, a gamma value offset to a default gamma value used by the device for the DBV band at the second brightness level, wherein the gamma value offset is determined to maintain consistency of measured relative luminance for the first and second brightness levels. The operations may further include determining, for a tap point representative of the range, a brightness value offset to a default brightness value for the tap point at the second brightness level, wherein the brightness value offset is determined to maintain consistency of measured gamma corrected luminance values for the first and second brightness levels after the gamma value offset is applied. The operations may also include storing, at the device and for the range, the gamma value offset and the brightness value offset, wherein subsequent to the storing, the device is configured to transition, in response to a fingerprint authentication triggering event, the display component from the first brightness level to the second brightness level by: overriding a default gamma value for an input gray level corresponding to the range based on the gamma value offset, and displaying a portion of the display component by applying, to the portion and for the input gray level, a value offset to a default brightness value at the second brightness level based on the brightness value offset.

In a third aspect, a device is provided. The device includes one or more processors operable to perform operations. The operations may include determining, for a device having a display component configured to operate at first and second brightness levels and for a display brightness value (DBV) band representative of a range of DBVs, a gamma value offset to a default gamma value used by the device for the DBV band at the second brightness level, wherein the gamma value offset is determined to maintain consistency of measured relative luminance for the first and second brightness levels. The operations may further include determining, for a tap point representative of the range, a brightness value offset to a default brightness value for the tap point at the second brightness level, wherein the brightness value offset is determined to maintain consistency of measured gamma corrected luminance values for the first and second brightness levels after the gamma value offset is applied. The operations may also include storing, at the device and for the range, the gamma value offset and the brightness value offset, wherein subsequent to the storing, the device is configured to transition, in response to a fingerprint authentication triggering event, the display component from the first brightness level to the second brightness level by: overriding a default gamma value for an input gray level corresponding to the range based on the gamma value offset, and displaying a portion of the display component by applying, to the portion and for the input gray level, a value offset to a default brightness value at the second brightness level based on the brightness value offset.

In a fourth aspect, an article of manufacture is provided. The article of manufacture may include a non-transitory computer-readable medium having stored thereon program instructions that, upon execution by one or more processors of a computing device, cause the computing device to carry out operations. The operations may include determining, for a device having a display component configured to operate at first and second brightness levels and for a display brightness value (DBV) band representative of a range of DBVs, a gamma value offset to a default gamma value used by the device for the DBV band at the second brightness level, wherein the gamma value offset is determined to maintain consistency of measured relative luminance for the first and second brightness levels. The operations may further include determining, for a tap point representative of the range, a brightness value offset to a default brightness value for the tap point at the second brightness level, wherein the brightness value offset is determined to maintain consistency of measured gamma corrected luminance values for the first and second brightness levels after the gamma value offset is applied. The operations may also include storing, at the device and for the range, the gamma value offset and the brightness value offset, wherein subsequent to the storing, the device is configured to transition, in response to a fingerprint authentication triggering event, the display component from the first brightness level to the second brightness level by: overriding a default gamma value for an input gray level corresponding to the range based on the gamma value offset, and displaying a portion of the display component by applying, to the portion and for the input gray level, a value offset to a default brightness value at the second brightness level based on the brightness value offset.

In a fifth aspect, a computer-implemented method is provided. The method may include detecting, for a device having a display component configured to operate at first and second brightness levels and via a graphical user interface displayed by the display component, a fingerprint authentication triggering event. The method may further include determining, based on the fingerprint authentication triggering event, a first portion of the graphical user interface to operate at the second brightness level. The method may also include retrieving, from a storage at the device and for an input gray level in a range of display brightness values (DBVs), a gamma value offset to a default gamma value and a brightness value offset to a default brightness value, the gamma value offset having been configured to maintain consistency of measured relative luminance for the first and second brightness levels, and the brightness value offset having been configured to maintain consistency of measured gamma corrected luminance values for the first and second brightness levels, and the gamma corrected luminance values having been measured after applying the gamma value offset. The method may additionally include transitioning, in response to the fingerprint authentication triggering event, the display component from the first brightness level to the second brightness level by: overriding a default gamma value for the input gray level based on the gamma value offset, and displaying a second portion of the display component by applying, to the second portion, a value offset to a default brightness value at the second brightness level based on the brightness value offset.

In a sixth aspect, a system is provided. The system may include one or more processors. The system may also include data storage, where the data storage has stored thereon computer-executable instructions that, when executed by the one or more processors, cause the system to carry out operations. The operations may include detecting, for a device having a display component configured to operate at first and second brightness levels and via a graphical user interface displayed by the display component, a fingerprint authentication triggering event. The operations may further include determining, based on the fingerprint authentication triggering event, a first portion of the graphical user interface to operate at the second brightness level. The operations may also include retrieving, from a storage at the device and for an input gray level in a range of display brightness values (DBVs), a gamma value offset to a default gamma value and a brightness value offset to a default brightness value, the gamma value offset having been configured to maintain consistency of measured relative luminance for the first and second brightness levels, and the brightness value offset having been configured to maintain consistency of measured gamma corrected luminance values for the first and second brightness levels, and the gamma corrected luminance values having been measured after applying the gamma value offset. The operations may additionally include transitioning, in response to the fingerprint authentication triggering event, the display component from the first brightness level to the second brightness level by: overriding a default gamma value for the input gray level based on the gamma value offset, and displaying a second portion of the display component by applying, to the second portion, a value offset to a default brightness value at the second brightness level based on the brightness value offset.

In a seventh aspect, a device is provided. The device includes one or more processors operable to perform operations. The operations may include detecting, for a device having a display component configured to operate at first and second brightness levels and via a graphical user interface displayed by the display component, a fingerprint authentication triggering event. The operations may further include determining, based on the fingerprint authentication triggering event, a first portion of the graphical user interface to operate at the second brightness level. The operations may also include retrieving, from a storage at the device and for an input gray level in a range of display brightness values (DBVs), a gamma value offset to a default gamma value and a brightness value offset to a default brightness value, the gamma value offset having been configured to maintain consistency of measured relative luminance for the first and second brightness levels, and the brightness value offset having been configured to maintain consistency of measured gamma corrected luminance values for the first and second brightness levels, and the gamma corrected luminance values having been measured after applying the gamma value offset. The operations may additionally include transitioning, in response to the fingerprint authentication triggering event, the display component from the first brightness level to the second brightness level by: overriding a default gamma value for the input gray level based on the gamma value offset, and displaying a second portion of the display component by applying, to the second portion, a value offset to a default brightness value at the second brightness level based on the brightness value offset.

In an eighth aspect, an article of manufacture is provided. The article of manufacture may include a non-transitory computer-readable medium having stored thereon program instructions that, upon execution by one or more processors of a computing device, cause the computing device to carry out operations. The operations may include detecting, for a device having a display component configured to operate at first and second brightness levels and via a graphical user interface displayed by the display component, a fingerprint authentication triggering event. The operations may further include determining, based on the fingerprint authentication triggering event, a first portion of the graphical user interface to operate at the second brightness level. The operations may also include retrieving, from a storage at the device and for an input gray level in a range of display brightness values (DBVs), a gamma value offset to a default gamma value and a brightness value offset to a default brightness value, the gamma value offset having been configured to maintain consistency of measured relative luminance for the first and second brightness levels, and the brightness value offset having been configured to maintain consistency of measured gamma corrected luminance values for the first and second brightness levels, and the gamma corrected luminance values having been measured after applying the gamma value offset. The operations may additionally include transitioning, in response to the fingerprint authentication triggering event, the display component from the first brightness level to the second brightness level by: overriding a default gamma value for the input gray level based on the gamma value offset, and displaying a second portion of the display component by applying, to the second portion, a value offset to a default brightness value at the second brightness level based on the brightness value offset.

Other aspects, embodiments, and implementations will become apparent to those of ordinary skill in the art by reading the following detailed description, with reference where appropriate to the accompanying drawings.

BRIEF DESCRIPTION OF THE FIGURES

FIG. 5 depicts a table illustrating gamma value offsets and brightness value offsets, in accordance with example embodiments.

FIG. 7 depicts a table illustrating gamma value offsets, in accordance with example embodiments.

DETAILED DESCRIPTION

Figure 1:
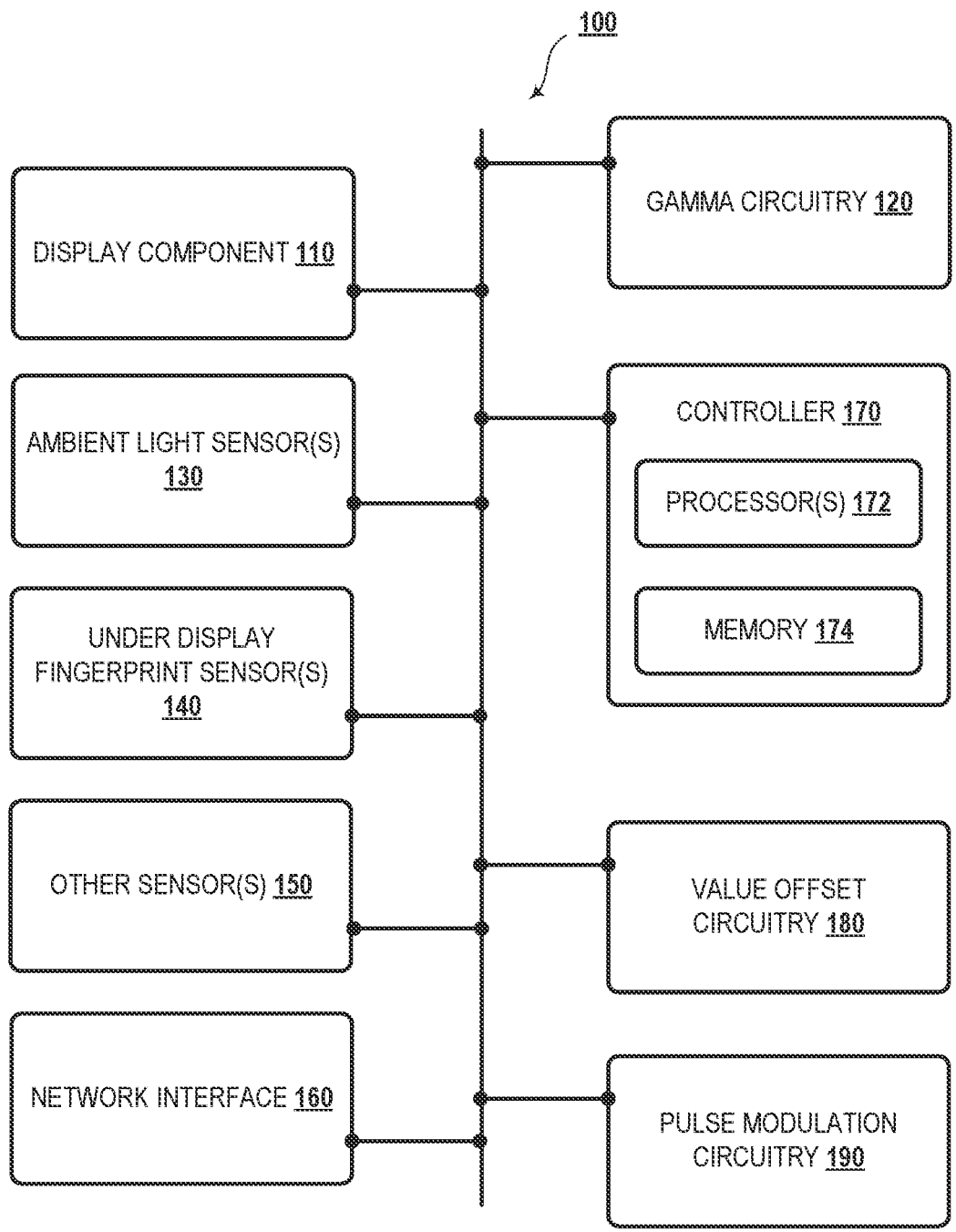
FIG. 1 illustrates a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. OVERVIEW

An under display fingerprint sensor (UDFPS) is an optical sensor that is laminated underneath a display component of a computing device. In order for the sensor to work during fingerprint authentication, light emitted by the display component is reflected back from a finger to be authenticated, back to the sensor. Generally, the display component may operate at a normal mode that corresponds to a low brightness level. Brightness levels can be measured as candelas per a square meter value or nits. Accordingly, the display component may operate at a normal mode that corresponds to at or below 500 nits. However, a high brightness mode for the display component may be desirable when authenticating the fingerprint. For example, to meet signal-to-noise ratio (SNR) requirements, the display component may need to be operated at 900 nits or more. However, changing from the normal mode to the high brightness mode can also cause optical defects, such as flicker.

Optical characteristics may differ between a normal mode and a high brightness mode. Specifically, the luminance and color of the display component may differ between the normal mode and the high brightness mode. When the display component switches from the normal mode to the high brightness mode (and vice versa), this optical difference may manifest itself as an optical defect on the display component. Consequently, the optical defect may become highly pronounced and detrimental to a user's experience.

Some of these issues may be addressed by adjusting the brightness mode transition based on a portion of the display component where the fingerprint authentication is taking place, and a portion where the fingerprint authentication is not taking place. Generally, multiple pulse-width modulations (PWMs) may be needed for a display to support multiple frequencies. However, it is not possible to support one PWM at the portion where the fingerprint authentication is taking place, and a different PWM at the portion where the fingerprint authentication is not taking place. Also, for example, it may be desirable for a first timing mechanism associated with the UDFPS to be aligned with a second timing mechanism associated with a driver of the PWMs. For example, a mismatch between the first timing mechanism and the second timing mechanism may lead to errors in obtaining an accurate fingerprint authentication. Also, for example, SNR may be higher with a single PWM, thereby increasing the accuracy of determining when fingerprint authentication is performed, and thereby reducing errors in the authentication.

Accordingly, in transitioning the display component for fingerprint authentication, it may be desirable to transition the display component from a first state that supports multiple PWMs to a second state that supports a single PWM. However, optical properties of the display component may be different in the first state and the second state.

Therefore, in transitioning the display component from the first state to the second state, such differences in respective optical properties may be manifested as a visible transitional optical defect.

Some techniques described herein address these issues by dynamically adjusting the brightness mode transition. Specifically, a computing device may transition the display component from the first brightness level to the second brightness level by: overriding a default gamma value for an input gray level based on a gamma value offset, and displaying a second portion of the display component by applying, to the second portion, a value offset to a default brightness value at the second brightness level based on a brightness value offset.

By using the herein-described techniques, multiple PWMs can be supported and multiple brightness levels can be utilized, while reducing or eliminating any optical defect. Other advantages are also contemplated and will be appreciated from the discussion herein.

II. EXAMPLE DEVICES

FIG. 1 illustrates computing device 100, in accordance with example embodiments. Computing device 100 includes display component 110, gamma circuitry 120, one or more ambient light sensor(s) 130, one or more under display fingerprint sensor(s) 140, one or more other sensor(s) 150, network interface 160, controller 170, value offset circuitry 180, and pulse modulation circuitry 190. In some examples, computing device 100 may take the form of a desktop device, a server device, or a mobile device. Computing device 100 may be configured to interact with an environment. For example, computing device 100 may obtain fingerprint information from an environment around computing device 100. Also, for example, computing device 100 may obtain environmental state measurements associated with an environment around computing device 100 (e.g., ambient light measurements, etc.).

Display component 110 may be configured to provide output signals to a user by way of one or more screens (including touch screens), cathode ray tubes (CRTs), liquid crystal displays (LCDs), light emitting diodes (LEDs), displays using digital light processing (DLP) technology, and/or other similar technologies. Display component 110 may also be configured to generate audible outputs, such as with a speaker, speaker jack, audio output port, audio output device, earphones, and/or other similar devices. Display component 110 may further be configured with one or more haptic components that can generate haptic outputs, such as vibrations and/or other outputs detectable by touch and/or physical contact with computing device 100.

In example embodiments, display component 110 is configured to operate at a given brightness level. The brightness level may correspond to an operation being performed by the display component. For example, when a UDFPS is activated, display component 110 may operate at a high brightness mode (HBM) corresponding to 800 or 900 nits. In example embodiments, display component 110 may operate at a low brightness mode corresponding to two nits to account for low environmental light intensity. In some other examples, display component 110 may operate at a normal brightness mode corresponding to 500 nits. In some embodiments, display component 110 may operate at a normal brightness mode, but boost the display brightness locally to a high brightness mode, for example, greater than 800 nits. Such a mode may be referred to herein as a local high brightness mode (LHBM).

In certain embodiments, display component 110 may be a color display utilizing a plurality of color channels for generating images. For example, display component 110 may utilize red, green, and blue (RGB) color channels, or cyan, magenta, yellow, and black (CMYK) color channels, among other possibilities. As further described below, gamma circuitry 120 may adjust the gamma characteristics for each of the color channels of display component 110.

In some embodiments, display component 110 may include a plurality of pixels disposed in a pixel array defining a plurality of rows and columns. For example, if display component 110 had a resolution of 1024×600, each column of the array may include 600 pixels and each row of the array may include 1024 groups of pixels, with each group including a red, blue, and green pixel, thus totaling 3072 pixels per row. In example embodiments, the color of a particular pixel may depend on a color filter that is disposed over the pixel.

In example embodiments, display component 110 may receive image data from controller 170 and correspondingly send signals to its pixel array in order to display the image data. To send image data to display component 110, controller 170 may first convert a digital image into numerical data that can be interpreted by display component 110. For instance, a digital image may contain various image pixels that correspond to respective pixels of display component 110. Each pixel of the digital image may have a numerical value that represents the luminance (e.g., brightness or darkness) of the digital image at a particular spot. These numerical values may be referred to as "gray levels." The number of gray levels may depend on the number of bits used to represent the numerical values. For example, if 8 bits were used to represent a numerical value, display component 110 may provide 256 gray levels, with a numerical value of 0) corresponding to full black and a numerical value of 255 corresponding to full white. As a more specific example, controller 170 may provide to display component 110 a digital image stream containing 24 bits, with 8 bits corresponding to a gray level for each of the red, green, and blue color channels of a pixel group.

In some cases, the luminance characteristics of images displayed by display component 110 may be depicted inaccurately when perceived by users. Such inaccuracies may result from the non-linear response of the human eye and could cause inaccurate portrayals of color/luminance on display component 110 from the viewpoint of users. To compensate for such inaccuracies, computing device 100 could use gamma circuitry 120.

Gamma circuitry 120 may include circuitry that could compensate for inaccuracies that occur when displaying images on display component 110. To do this, gamma circuitry may include memory for storing one or more gamma curves/tables. The values in each curve/table may be determined based upon the transmittance sensitivities of display component 110 over a range of input gray levels.

Figure 2:
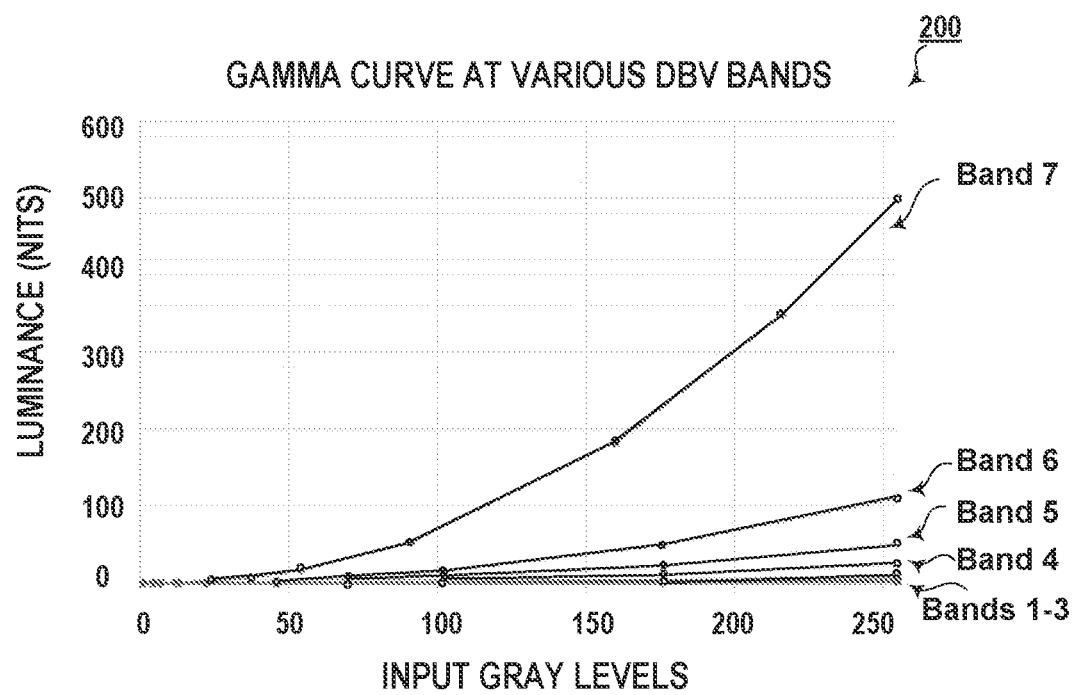
FIG. 2 depicts a graph illustrating example gamma curves, in accordance with example embodiments.

As an illustrative example. FIG. 2 depicts graph 200 that includes various gamma curves. Each gamma curve may correspond to a display brightness value (DBV) band. The use of a particular DBV band (and thus a particular gamma curve) may be based on user input. For instance, a user may select, perhaps by interacting with a brightness adjustment bar, a maximum brightness for display component 110. Based on that maximum brightness, display component 110 may choose a corresponding DBV band (and thus a corresponding gamma curve) to compensate for inaccuracies that occur when displaying images.

As shown in graph 200, each gamma curve includes a relationship between input gray levels (on the x-axis) and luminance of a viewable image displayed on display component 110 (on the y-axis). These relationships are non-linear. For instance, in band 7, an input gray level of 200 corresponds to a luminance value of 300 nits. Consequently, by using a gamma curve to adjust input gray levels, the images displayed on display component 110 may exhibit a non-linear luminance to input gray level relationship. Yet, when viewed by a user, the response of the human eye may cause the user to perceive the displayed images as having a linear relationship between luminance and input gray level. Thus, by using gamma curves, display component 110 is able to produce images that may be perceived by a user as having a generally linear relationship with regard to input gray level and luminance.

Referring again to FIG. 1, ambient light sensor(s) 130 may be configured to receive light from an environment of (e.g., within 1 meter (m), 5 m, or 10 m of) computing device 100. Ambient light sensor(s) 130 may include one or more single photon avalanche detectors (SPADs), avalanche photodiodes (APDs), complementary metal oxide semiconductor (CMOS) detectors, and/or charge-coupled devices (CCDs). For example, ambient light sensor(s) 130 may include indium gallium arsenide (InGaAs) APDs configured to detect light at wavelengths around 1550 nanometers (nm). Other types of ambient light sensor(s) 130 are possible and contemplated herein.

In some embodiments, ambient light sensor(s) 130 may include a plurality of photodetector elements disposed in a one-dimensional array or a two-dimensional array. For example, ambient light sensor(s) 130 may include sixteen detector elements arranged in a single column (e.g., a linear array). The detector elements could be arranged along, or could be at least parallel to, a primary axis.

In some embodiments, computing device 100 can include one or more fingerprint sensor(s) 140. In some embodiments, fingerprint sensor(s) 140 may include one or more image capture devices that can take an image of a finger. Fingerprint sensor(s) 140 are utilized to authenticate a fingerprint. The image of the finger captured by the one or more image capture devices is compared to a stored image for authentication purposes. A high brightness level is generally needed to illuminate the finger adequately to meet SNR requirements. The light from display component 110 is reflected from the finger back to the fingerprint sensor(s) 140. Generally, fingerprint sensor(s) 140 is associated with a timing mechanism. In some embodiments, fingerprint sensor(s) 140 is configured with a time threshold within which the authentication process is to be completed. When the authentication process is not completed within the time threshold, the authentication process fails. In some embodiments, display component 110 may attempt to re-authenticate the fingerprint. Such repetitive authentication processes can cause a high consumption of power, and can cause optical defects perceptible to the user of computing device 100.

In some embodiments, computing device 100 can include one or more other sensor(s) 150. Other sensor(s) 150 can be configured to measure conditions within computing device 100 and/or conditions in an environment of (e.g., within 1 m, 5 m, or 10 m of) computing device 100 and provide data about these conditions. For example, other sensor(s) 150 can include one or more of: (i) sensors for obtaining data about computing device 100, such as, but not limited to, a thermometer for measuring a temperature of computing device 100, a battery sensor for measuring power of one or more batteries of computing device 100, and/or other sensors measuring conditions of computing device 100: (ii) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and/or a laser tracker, where the identification sensor can be configured to read identifiers, such as RFID tags, barcodes, QR codes, and/or other devices and/or objects configured to be read, and provide at least identifying information; (iii) sensors to measure locations and/or movements of computing device 100, such as, but not limited to, a tilt sensor, a gyroscope, an accelerometer, a Doppler sensor, a Global Positioning System (GPS) device, a sonar sensor, a radar device, a laser-displacement sensor, and/or a compass: (iv) an environmental sensor to obtain data indicative of an environment of computing device 100, such as, but not limited to, an infrared sensor, an optical sensor, a biosensor, a capacitive sensor, a touch sensor, a temperature sensor, a wireless sensor, a radio sensor, a movement sensor, a proximity sensor, a radar receiver, a microphone, a sound sensor, an ultrasound sensor and/or a smoke sensor; and/or (v) a force sensor to measure one or more forces (e.g., inertial forces and/or G-forces) acting about computing device 100, such as, but not limited to one or more sensors that measure: forces in one or more dimensions, torque, ground force, friction, and/or a zero moment point (ZMP) sensor that identifies ZMPs and/or locations of the ZMPs. Many other examples of other sensor(s) 150 are possible as well.

Data gathered from ambient light sensors(s) 130, fingerprint sensor(s) 140, and other sensor(s) 150 may be communicated to controller 170, which may use the data to perform one or more actions.

Network interface 160 can include one or more wireless interfaces and/or wireline interfaces that are configurable to communicate via a network Wireless interfaces can include one or more wireless transmitters, receivers, and/or transceivers, such as a Bluetooth™ transceiver, a Zigbee® transceiver, a Wi-Fi™ transceiver, a WiMAX™ transceiver, and/or other similar types of wireless transceivers configurable to communicate via a wireless network. Wireline interfaces can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network interface 160 can be configured to provide reliable, secured, and/or authenticated communications. For each communication described herein, information for facilitating reliable communications (e.g., guaranteed message delivery) can be provided, perhaps as part of a message header and/or footer (e.g., packet/message sequencing information, encapsulation headers and/or footers, size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

Controller 170 may include one or more processor(s) 172 and memory 174. Processor(s) 172 can include one or more general purpose processors and/or one or more special purpose processors (e.g., display driver integrated circuit (DDIC), digital signal processors (DSPs), tensor processing units (TPUs), graphics processing units (GPUs), application specific integrated circuits (ASICs), etc). Processor(s) 172 may be configured to execute computer-readable instructions that are contained in memory 174 and/or other instructions as described herein.

Memory 174 may include one or more non-transitory computer-readable storage media that can be read and/or accessed by processor(s) 172. The one or more non-transitory computer-readable storage media can include volatile and/or non-volatile storage components, such as optical, magnetic, organic, or other memory or disc storage, which can be integrated in whole or in part with at least one of processor(s) 172. In some examples, memory 174 can be implemented using a single physical device (e.g., one optical, magnetic, organic or other memory or disc storage unit), while in other examples, memory 174 can be implemented using two or more physical devices.

In example embodiments, processor(s) 172 are configured to execute instructions stored in memory 174 to carry out operations.

The operations may include detecting, for a computing device 100 having a display component 110 configured to operate at first and second brightness levels and via a graphical user interface displayed by the display component 110, a fingerprint authentication triggering event. For example, display component 110 may be operating at a normal brightness mode of 500 nits. In some embodiments, the fingerprint authentication triggering event involves a physical interaction between a user and the graphical user interface displayed by display component 110.

The operations may also include determining, based on the fingerprint authentication triggering event, a first portion of the graphical user interface to operate at the second brightness level (e.g., high brightness mode of 900 nits).

In some embodiments, the brightness value for the normal mode or the high brightness mode can be a relative value. For example, the brightness value may be a percentage of a total possible brightness for display component 110 (e.g., 45% or 55%). In some embodiments, the brightness value may be an absolute value. For example, the brightness value may be a value expressed in candelas per a square meter value or nits (e.g., 60 nits or 80 nits).

The operations may further include retrieving, from a storage (e.g., memory 174) at the computing device 100 and for an input gray level in a range of display brightness values (DBVs), a gamma value offset to a default gamma value and a brightness value offset to a default brightness value, the gamma value offset having been configured to maintain consistency of measured relative luminance for the first and second brightness levels, and the brightness value offset having been configured to maintain consistency of measured gamma corrected luminance values for the first and second brightness levels, and the gamma corrected luminance values having been measured after applying the gamma value offset.

The operations may further include transitioning, in response to the fingerprint authentication triggering event, the display component 110 from the first brightness level (e.g., normal brightness mode) to the second brightness level (high brightness mode). For example, controller 170 may transition display component 110 from a 500 nits brightness level to a 900 nits brightness level. The operations may also include overriding a default gamma value for the input gray level based on the gamma value offset, and displaying a second portion of the display component by applying, to the second portion, a value offset to a default brightness value at the second brightness level based on the brightness value offset.

Value offset circuitry 180 may include circuitry that could apply the gamma value offsets and brightness value offsets described herein to display component 110. To do this, value offset circuitry 180 may include memory for storing one or more gamma curves/lookup tables. The values in each curve/lookup table may be determined based upon the transmittance sensitivities of display component 110 over a range of input gray levels.

In some embodiments, display component 110 may include a plurality of color channels. The default gamma value may include respective register values for the plurality of color channels, and the gamma value offset may include an offset to at least one of the register values of the default gamma value. In such embodiments, the plurality of color channels may include red, green, and blue (RGB) color channels.

To modify gamma values and brightness values of tap points, some implementations involve altering one or more register values in value offset circuitry 180. For instance, value offset circuitry 180 could include a set of hardware registers for each tap point in table 500 of FIG. 5 as described below. Value offset circuitry 180 could use the values in these registers to alter the input gray levels signals sent by controller 170 to display component 110. Generally speaking, the number of hardware registers for a given tap point corresponds to the number of color channels used by display component 110. For example, if display component 110 used RGB color channels, then value offset circuitry 180 may contain three hardware registers for a given tap point, each of the three registers corresponding to one of the RGB color channels. Also, for example, to apply a gamma value offset or a brightness value offset, different offsets may be applied to register values for the different RGB channels.

Pulse modulation circuitry 190 may include circuitry that modulates pulse-width modulations (PWMs) for display component 110. In some embodiments, multiple PWMs (e.g., six) may be needed for a display to support multiple frequencies (e.g., 60 Hz, 90 Hz, 120 Hz, and so forth). Also, for example, a timing mechanism may be associated with a driver of the PWMs. Generally, when display component 110 is operated at 360 Hz electromagnetic frequency with six pulses. UDFPS may fail to authenticate a fingerprint due to high SNR. Although LHBM may be utilized, there may be errors in authentication due to a sensor clock drift issue (e.g., a mismatch between a first timing mechanism for fingerprint sensor(s) 140 and a second timing mechanism for pulse modulation circuitry 190), and high PWM noise. Accordingly, it may be desirable to operate display component 110 at a single PWM, instead of multiple PWMs (e.g., six).

Figure 3:
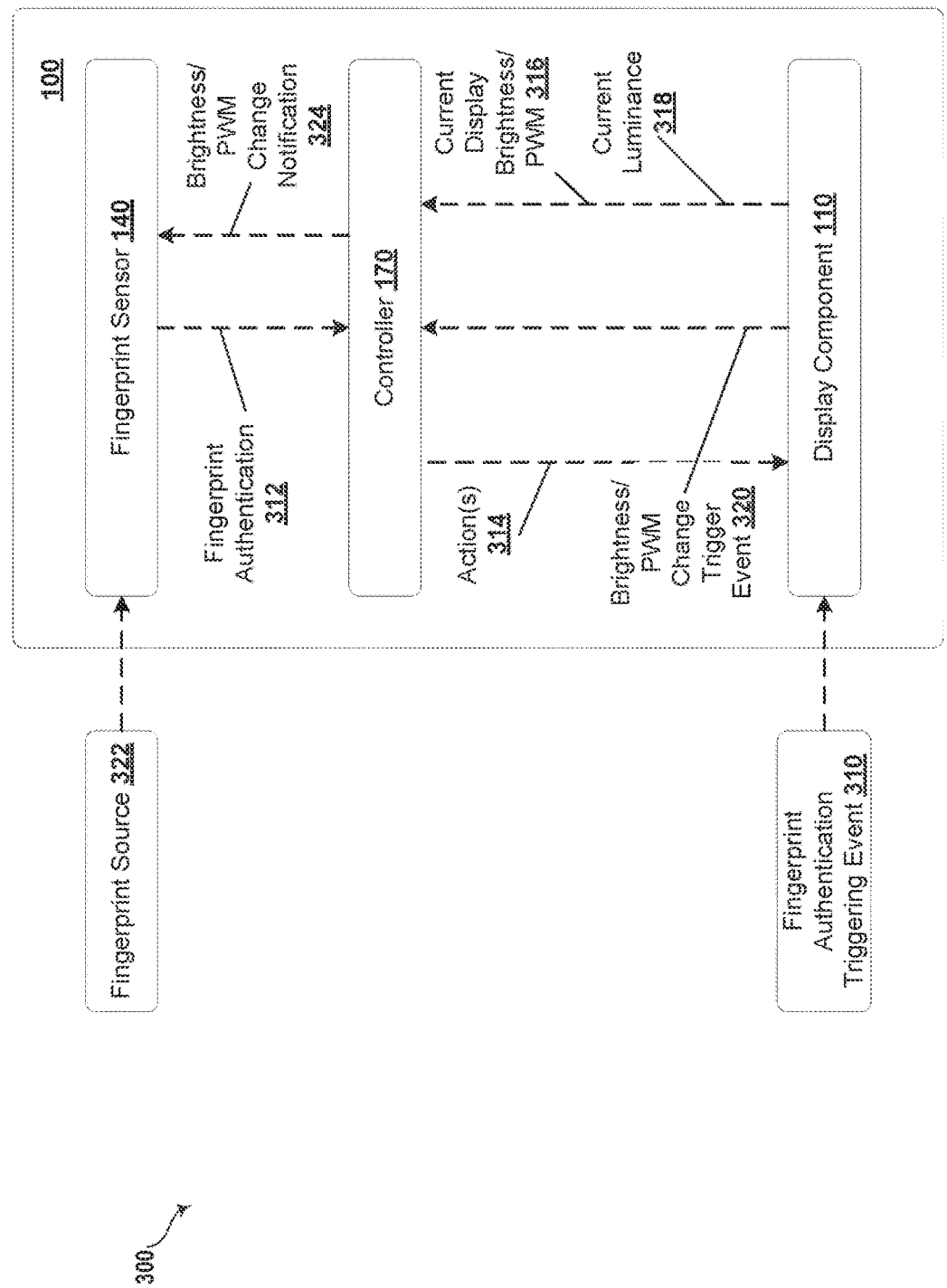
FIG. 3 illustrates a relationship between a computing device and an environment, in accordance with example embodiments.

FIG. 3 illustrates a relationship between computing device 100 and environment 300, in accordance with example embodiments. Environment 300 may represent the environment surrounding computing device 100 and includes fingerprint source 322 and fingerprint authentication triggering event 310 (e.g., sensing the finger near display component 110).

In some embodiments, for computing device 100 having display component 110 configured to operate at first and second brightness levels, a fingerprint authentication triggering event 310 may be detected via a graphical user interface displayed by display component 110. Fingerprint authentication triggering event 310 may represent an event external to computing device 100. Fingerprint authentication triggering event 310 may act on display component 110. In some embodiments, fingerprint authentication triggering event 310 may include a user touching a touch screen interface of display component 110 to initiate a fingerprint authentication process. In some embodiments, fingerprint authentication triggering event 310 may include a finger hovering over a touch screen interface of display component 110 to initiate a fingerprint authentication process. In some embodiments, fingerprint authentication triggering event 310 may cause display component 110 to communicate brightness/PWM change trigger event 320 to controller 170, which may responsively perform action(s) 314 based on brightness/PWM change trigger event 320. In some embodiments, fingerprint authentication triggering event 310 may cause display component 110 to communicate current display brightness/PWM 316 and current luminance 318 to controller 170.

For example, upon receiving brightness/PWM change trigger event 320, controller 170 may transition display component 110 from a first brightness level (e.g., 500 nits) to second brightness level (e.g., 900 nits) and from multiple PWMs (e.g., four or six) to a single PWM. Generally, a sudden transition from a low brightness mode to a high brightness mode and/or change in a number of PWMs can cause an optical defect. For example, when a user views a screen at night, a change in the brightness level to 900 nits causes the screen to appear very bright. For example, ambient light sensor(s) 130 may receive ambient light measurements from the environment around computing device 100, and the brightness level for the normal mode may be set at two nits. One solution may be to maintain the fingerprint sensing area at greater than 800 nits, while displaying the remaining portion of the screen at two nits (compatible with the low environmental lighting conditions at night). However, such a configuration causes bending to occur. Therefore, it is desirable to transition display component 110 from the first brightness level to the second brightness level in a smooth manner to reduce and/or eliminate a perceived bending, flicker, or other optical defect.

In some embodiments, based on the fingerprint authentication triggering event, a first portion of the graphical user interface may be determined to operate at normal mode, while a second portion corresponding to the fingerprint authentication region, may be operated at the second brightness level. For example, upon receiving the current display brightness/PWM 316 and current luminance 318, controller 170 may cause display component 110 to display the first portion of the display component by overriding a default gamma value for the input gray level based on the gamma value offset, and applying, to the first portion, a brightness value offset to a default brightness value at the second brightness level. In some embodiments, the gamma value offset is configured to maintain consistency of measured relative luminance for the first and second brightness levels, and the brightness value offset is configured to maintain consistency of measured gamma corrected luminance values for the first and second brightness levels. In some embodiments, the gamma value offset and/or the brightness value offset is based on values of current display brightness/PWM 316 and current luminance 318 received by controller 170.

Generally, the gamma corrected luminance values are measured after applying the gamma value offset.

As described herein, the gamma value offset to be applied to the default gamma value and the brightness value offset to be applied to the default brightness value may be retrieved from a storage at computing device 100.

Also, for example, after transitioning display component 110 from the first brightness level to the second brightness level, from six PWMs to a single PWM, and after adjusting the displayed first portion and second portion, controller 170 may communicate a brightness/PWM change notification 324 to fingerprint sensor(s) 140. Fingerprint sensor(s) 140 may be optically-coupled to environment 300. That is, the arrangement of fingerprint sensor(s) 140 within computing device 100 may enable fingerprint sensor(s) 140 to capture an image of the finger at fingerprint source 322 from a field of view of environment 300.

Fingerprint sensor(s) 140 may, in response to receiving brightness/PWM change notification 324, capture the image of a finger at fingerprint source 322. For example, fingerprint source 322 may include a finger to be authenticated, and fingerprint sensor(s) 140 may receive light reflected off of the finger in environment 300. As indicated, the second brightness level conforms to SNR requirements. Upon capturing the image, fingerprint sensor(s) 140 may attempt to authenticate the fingerprint, and communicate the results to controller 170 as fingerprint authentication 312.

In some embodiments, fingerprint authentication triggering event 310 may cause controller 170 to start an internal clock. The internal clock can determine an allowable time threshold within which fingerprint authentication 312 has to be completed. Upon completion of the fingerprint authentication within the time threshold, controller 170 may stop the internal clock. However, when the fingerprint authentication is not completed within the time threshold, the internal clock may stop and controller 170 may direct fingerprint sensor(s) 140 to terminate the authentication process. For example, the fingerprint authentication may not be completed within the time threshold when the image resolution of the fingerprint does not meet SNR requirements. One or more additional and/or alternate factors may cause the fingerprint authentication to not be completed within the time threshold. For example, the one or more factors may include an intensity of ambient light, a distance of fingerprint source 322 from computing device 100, and/or a fingerprint from fingerprint source 322 not matching the stored fingerprint.

Upon termination of the authentication process, controller 170 may cause display component 110 to transition from the second brightness level to the first brightness level. In some embodiments, where controller 170 applies a gamma value offset and a brightness value offset to the gray level, upon termination of the authentication process, controller 170 may revert to luminance values at the normal mode or first brightness level.

While FIG. 3 illustrates a particular arrangement of elements, other arrangements are possible. Additionally or alternatively, some elements of computing device 100 and environment 300 may be combined and/or rearranged.

III. EXAMPLE OFFSETS TO GAMMA VALUES AND BRIGHTNESS VALUES

Gamma Value Offset

In some embodiments, for a device having a display component configured to operate at first and second brightness levels and for a display brightness value (DBV) band representative of a range of DBVs, a gamma value offset to a default gamma value used by the device for the DBV band at the second brightness level may be determined. The gamma value offset is generally determined to maintain consistency of measured relative luminance for the first and second brightness levels. For example, display component 110 may be configured to operate at a normal mode or a local high brightness mode. Accordingly, in transitioning from the normal mode to the local high brightness mode, a gamma value offset to a default gamma value used by computing device 100 in the local high brightness mode may be determined. In some embodiments, the gamma value offset may be determined for a range of DBVs. For example, a tap point may be selected for a range of DBVs, and a gamma value offset may be determined for the representative tap point. Subsequently, this gamma value offset may be applied to the entire range of DBVs.

The term "LHBM OFF" as used herein, generally refers to a normal mode of operation. For example, when the UDFPS is not activated, display component 410 may operate in normal mode. The term "LHBM ON" as used herein, generally refers to a mode of operation where display component 410 is configured to operate locally in high brightness mode (LHBM). For example, in LHBM ON mode, a fingerprint detection portion of display component 410 may be operated locally at a high brightness mode to enable fingerprint detection; however, a portion of display component 410 outside the fingerprint detection portion may be operated at normal mode.

Figure 4:
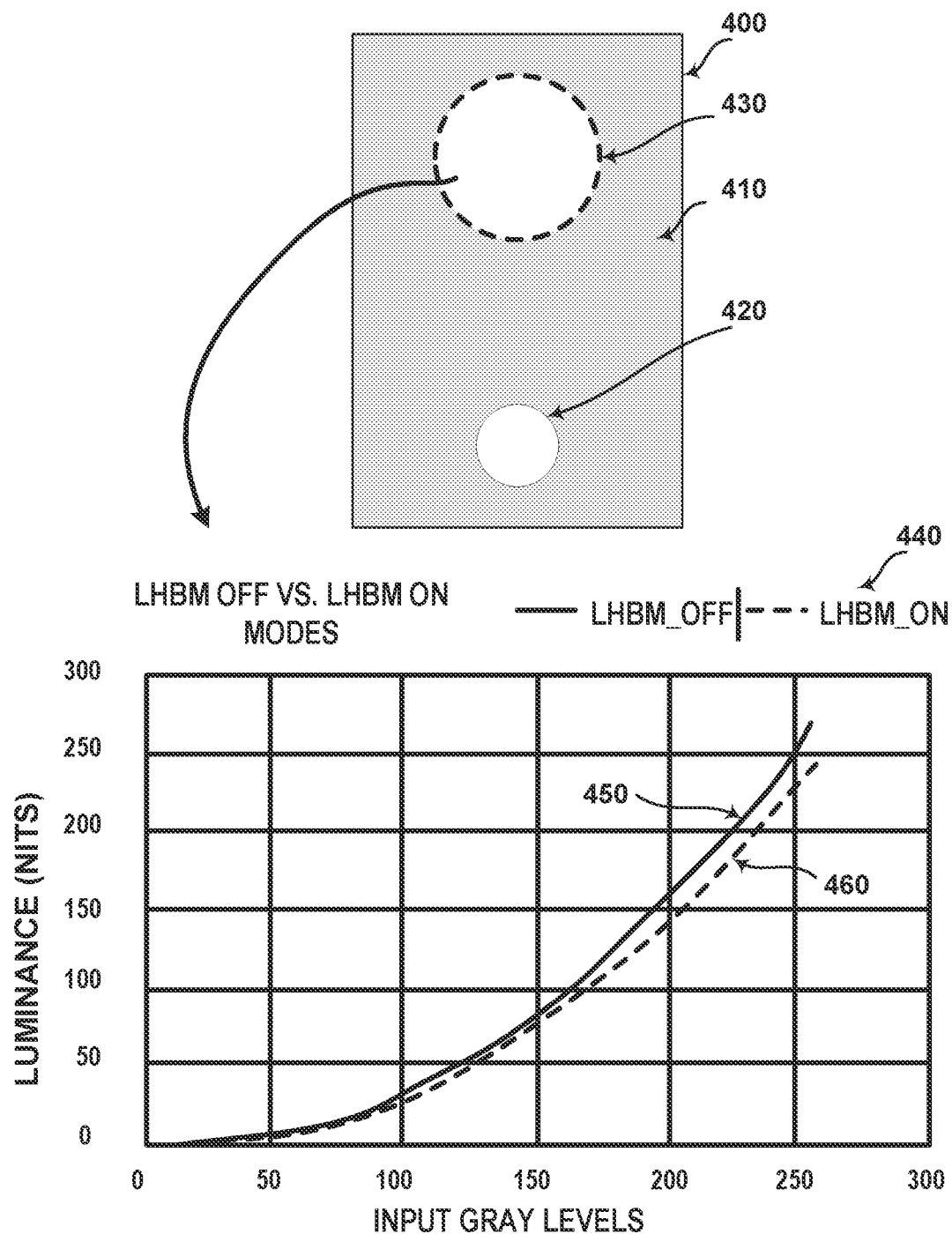
FIG. 4 depicts a device and a graph illustrating display luminance versus gray level in two brightness modes, in accordance with example embodiments.

FIG. 4 depicts a device 400 and a graph 440 illustrating display luminance versus gray level in two brightness modes, such as LHBM OFF and LHBM ON modes, in accordance with example embodiments. Device 400 may comprise a display component 410 configured to operate locally in high brightness mode (LHBM). In some embodiments, computing device 100 may be configured to operate a second portion of display component 110 at the second brightness level, and where the second portion may be determined based on a fingerprint authentication triggering event. For example, a detection portion 420 (second portion) where fingerprint authentication may occur may be operated locally at a brightness of 800 nits or higher. The remainder of display component 410 (e.g., a region outside detection portion 420) may be operated at normal mode. When the UDFPS is not activated, display component 410 may operate in "LHBM OFF" mode, whereas when the UDFPS is activated, display component 410 may operate in "LHBM ON" mode.

In transitioning from LHBM OFF to LHBM ON, flicker may be observed in a portion of display component 410, such as, for example, portion 430 depicted with a dashed circular boundary. Graph 440 illustrates how such an optical defect in portion 430 may occur due to differences in luminance performance when transitioning from LHBM OFF to LHBM ON. For example, portion 430 may exhibit different luminance performance between LHBM OFF and LHBM ON modes, thereby causing an optical defect.

In some embodiments, display component 110 may be configured to operate at one or more electromagnetic pulses, and computing device 100 may be configured to transition, in response to the fingerprint authentication triggering event, display component 110 from an initial number of electromagnetic pulses (e.g., four or six) to a single electromagnetic pulse.

The horizontal axis of graph 440 displays gray levels in a range from 0 to 300 and a corresponding luminance is displayed along the vertical axis. Graph 440 includes two curves. LHBM OFF curve 450 (shown as a solid line curve) displays luminance versus gray level in the LHBM OFF mode (or normal mode), with the display luminance values ranging from 0 to 300 nits. LHBM ON curve 460 (shown as a dashed line curve) displays luminance versus gray level in the local high brightness mode. As indicated, curves 450 and 460 have increasingly diverging luminance values as a value of an input gray level increases. As described herein, such a discrepancy between the luminance values may be minimized by applying a gamma value offset and a brightness value offset. For example, in adjusting the display brightness, display component 110 may utilize a plurality of tap points (e.g., 25 nits, 50 nits, 80 nits, 250 nits, and so forth). Accordingly, a gamma value offset and a brightness value offset may be applied at respective tap points to modulate the display brightness settings. Applying these offsets would generally align the luminance values in LHBM OFF and LHBM ON modes, thereby eliminating the discrepancy in luminance values as illustrated, between curves 450 and 460.

In some embodiments. LHBM OFF curve 450 (or normal curve) and LHBM ON curve 460 may be predetermined for computing device 100. For example, LHBM OFF curve 450 and LHBM ON curve 460 may correspond to the following equations, respectively, with $\gamma=2.2$:

$$L_{Grey\ x, normal\ mode} = \left(\frac{Grey\ x}{Grey\ 255}\right)^{\gamma} * L_{Grey\ 255, normal\ mode} \quad \text{(Eqn. 1)}$$

$$L_{Grey\ y, LHBM} = \left(\frac{Grey\ y}{Grey\ 255}\right)^{\gamma} * L_{Grey\ 255, LHBM} \quad \text{(Eqn. 2)}$$

In some embodiments, Eqn. 1 and Eqn. 2 may be programmed into the display driver integrated circuit (DDIC). In some embodiments, curves corresponding to multiple values of $\gamma$ can be programmed into the DDIC.

FIG. 5 depicts a table 500 illustrating gamma value offsets and brightness value offsets, in accordance with example embodiments. Namely, the table 500 of FIG. 5 is provided as an example of a table that may be utilized by controller 170 to adjust the brightness level of display component 110 for a portion outside the fingerprint authentication portion, such as, for example, outside detection portion 420 of FIG. 4. First column 5C1 displays a display brightness value (DBV) range: second column 5C2 displays a corresponding brightness range in nits: third column 5C3 identifies a corresponding regamma curve that applies a gamma value offset: fourth column 5C4 displays a DBV offset for a brightness value offset, and fifth column displays factory settings for values for LHBM OFF versus LHBM ON modes.

In some embodiments, display brightness values may be grouped into buckets, and computing device 100 may be configured with a gamma correction curve. Accordingly, for each bucket, a regamma curve may be determined based on a gamma value offset for a DBV band corresponding to the bucket. For example, first column 5C1 illustrates various example buckets (each corresponding to a range of DBVs), and third column 5C3 illustrates regamma curves corresponding to each bucket. In overriding a default gamma value for a given input gray level corresponding to a given bucket, a regamma curve corresponding to the given bucket may be used. For example, two different input gray levels in the same bucket map to a same regamma curve, as indicated by each row of table 500. Also, for example, two different input gray levels in the same bucket map to a same brightness value offset, as indicated by each row of table 500.

In some embodiments, computing device 100 may be configured with multiple gamma correction curves, and regamma curves corresponding to respective buckets may be determined from a same gamma correction curve. In some embodiments, computing device 100 may be configured with multiple gamma correction curves, and regamma curves corresponding to different buckets may be determined from different gamma correction curves.

For example, row 5R1 corresponds to a DBV range of greater than 199 nits, where the corresponding brightness values are greater than 100 nits. In such an instance, no regamma curve is needed. For example, no offset to a gamma value needs to be applied. However, a brightness value offset may be applied as 84.3% of the brightness level in the LHBM OFF mode. Also, for example, at a tap point of 250 nits, the factory settings for values for LHBM OFF versus LHBM ON modes may be 3FF versus 35F. Rows 5R2, 5R3, and 5R4 display values for various DBV ranges. Although the DBV band in this example is divided into four ranges, additional and/or alternative ranges may be utilized.

Figure 6:
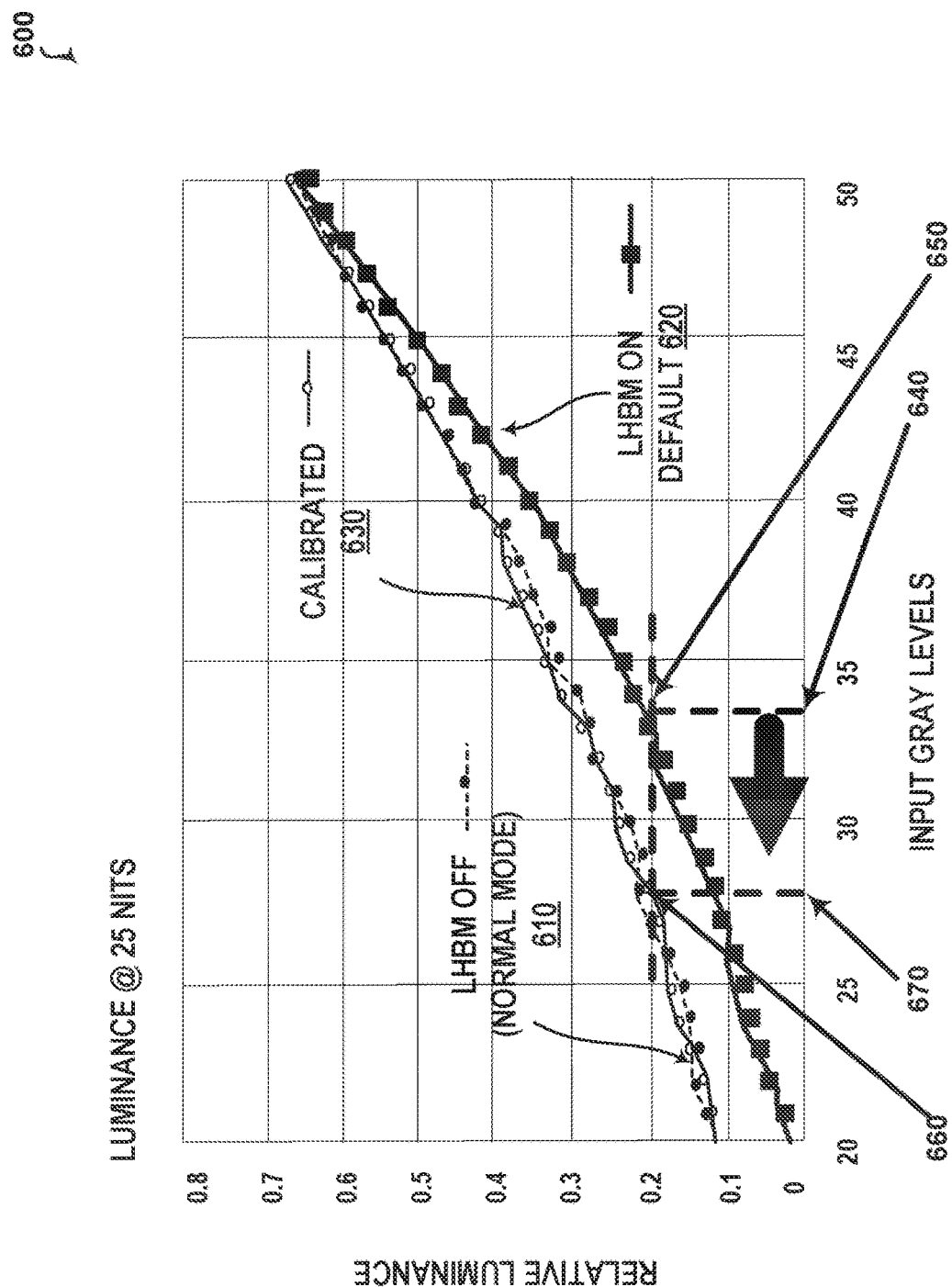
FIG. 6 depicts a graph illustrating relative luminance versus gray level at an example tap point, in accordance with example embodiments.

FIG. 6 depicts a graph 600 illustrating relative luminance versus gray level at an example tap point (e.g., 25 nits), in accordance with example embodiments. The horizontal axis of graph 600 displays gray levels in a range from 20 to 50 and a corresponding relative luminance is displayed along the vertical axis as a range from 0 to 0.8. The term "relative luminance" as used herein, generally refers to luminance values normalized to the luminance value G255 at gray level 255. For example, for a luminance value G100 at a gray level value of 100, the relative luminance may be determined as G100/G255.

Graph 600 includes three curves: LHBM OFF curve 610 (shown as a dashed line curve with filled-in ovals) displays luminance versus gray level in the LHBM OFF mode (or normal mode); LHBM ON default curve 620 (shown as a solid line curve with filled-in squares) displays luminance versus gray level in a default local high brightness mode; and calibrated curve 630 (shown as a solid line curve with empty ovals). Generally, relative luminance values for LHBM ON default curve 620 may be offset to match relative luminance values for LHBM OFF curve 610 to obtain calibrated curve 630.

As an example, for a gray level 640 corresponding approximately to a value of 33, controller 170 may cause display component 110 to be displayed at a relative brightness/luminance value 650 of 0.2, as indicated by LHBM ON default curve 620. However, LHBM OFF curve 610 indicates that the same relative brightness/luminance value 660 of 0.2 is displayed for a gray level 670 corresponding approximately to a value of 28. Accordingly, controller 170 may apply a brightness value offset to the gray level 640 for display component 110 in LHBM ON mode, by changing the gray level from 649 (corresponding value of 33) to 670 (corresponding value of 28) for the LHBM ON default curve 620, to match the relative luminance value for the LHBM OFF curve 610 at gray level 670. As a result, calibrated curve 630 may be obtained.

In some embodiments, a lookup table may be stored in memory 174, where the lookup table represents, for different values of γ, the relationship between luminance values and gray levels corresponding to different brightness levels. In some embodiments, the storing may include storing a gamma value offset and a brightness value offset in a boot image of computing device 100.

FIG. 7 depicts a table 700 illustrating gamma value offsets, in accordance with example embodiments. For example, table 700 illustrates an example lookup table for a regamma curve. As indicated in table 700, first column 7C1 displays initial (default) gamma values, and second column 7C2 displays recalibrated gamma values (or a regamma curve) based on gamma value offsets. For example, as illustrated in row 7R1, a default gamma value of 704 is recalibrated to a gamma value of 688. As another example, as illustrated in row 7R2, a default gamma value of 1024 is recalibrated to a gamma value of 976. It may be noted that gamma values range from 0 to 4096, and so table 700 displays a subset of values of a regamma curve in second column 7C2.

In some embodiments, first and second luminance values of display component 110 at respective first and second brightness levels (e.g., LHBM OFF and LHBM ON modes, respectively) may be measured from computing device 100 and for each range of DBVs. For example, an image can be displayed on computing device 100 for a fixed DBV band and gray level at each brightness level, and a colorimeter can capture the image and measure the respective luminance values. From a cross-section of each image, respective brightness levels at each gray level can be determined. In some instances, depending on how the colorimeter is calibrated, the measurement of the brightness level may not be an absolute value of the brightness level, but may be a relative value between the two operating modes. In some embodiments, such measurements may be performed for a representative tap point within a DBV range. Also, for example, different measurements can be determined for various optical viewing distances and/or viewing angles, and such measurements can be appropriately normalized and/or averaged. For purposes of clarity, the examples herein will refer to a luminance value Based on such measurements, measured relative luminance values for the first and second brightness levels may be determined, as illustrated with reference to FIG. 6.

Although FIGS. 6 and 7 illustrate an application of gamma value offsets at a particular tap point of 25 nits, similar gamma value offsets may be determined for additional tap points. Also, for example, regamma curves representing the gamma value offsets at each tap point may be determined at the time of manufacture, and may be stored in computing device 100. In some embodiments, the storing may include storing the gamma value offset in a boot image of computing device 100. As indicated in third column 5C3 of table 500, various regamma curves may be determined at various tap points. The labels "Algo43 and "Algo41" are for illustrative purposes only. Generally, regamma curves may be stored in computing device 100 with an appropriate label for case of lookup operations.

After a gamma value offset, or a regamma curve, is determined for a range of DBVs, it may be stored at computing device 100. Subsequent to the storing, computing device 100 may be configured to transition, in response to a fingerprint authentication triggering event, display component 110 from the first brightness level to the second brightness level by overriding a default gamma value for an input gray level corresponding to the range based on the gamma value offset.

Brightness Value Offset

As described herein, in an effort to mitigate perceived optical defects, a brightness value adjustment may also be made. In some embodiments, for a tap point representative of a DBV range, a brightness value offset to a default brightness value may be determined for the tap point at the second brightness level. Generally, the brightness value offset is determined to maintain consistency of measured gamma corrected luminance values for the first and second brightness levels after the gamma value offset is applied.

Figure 8:
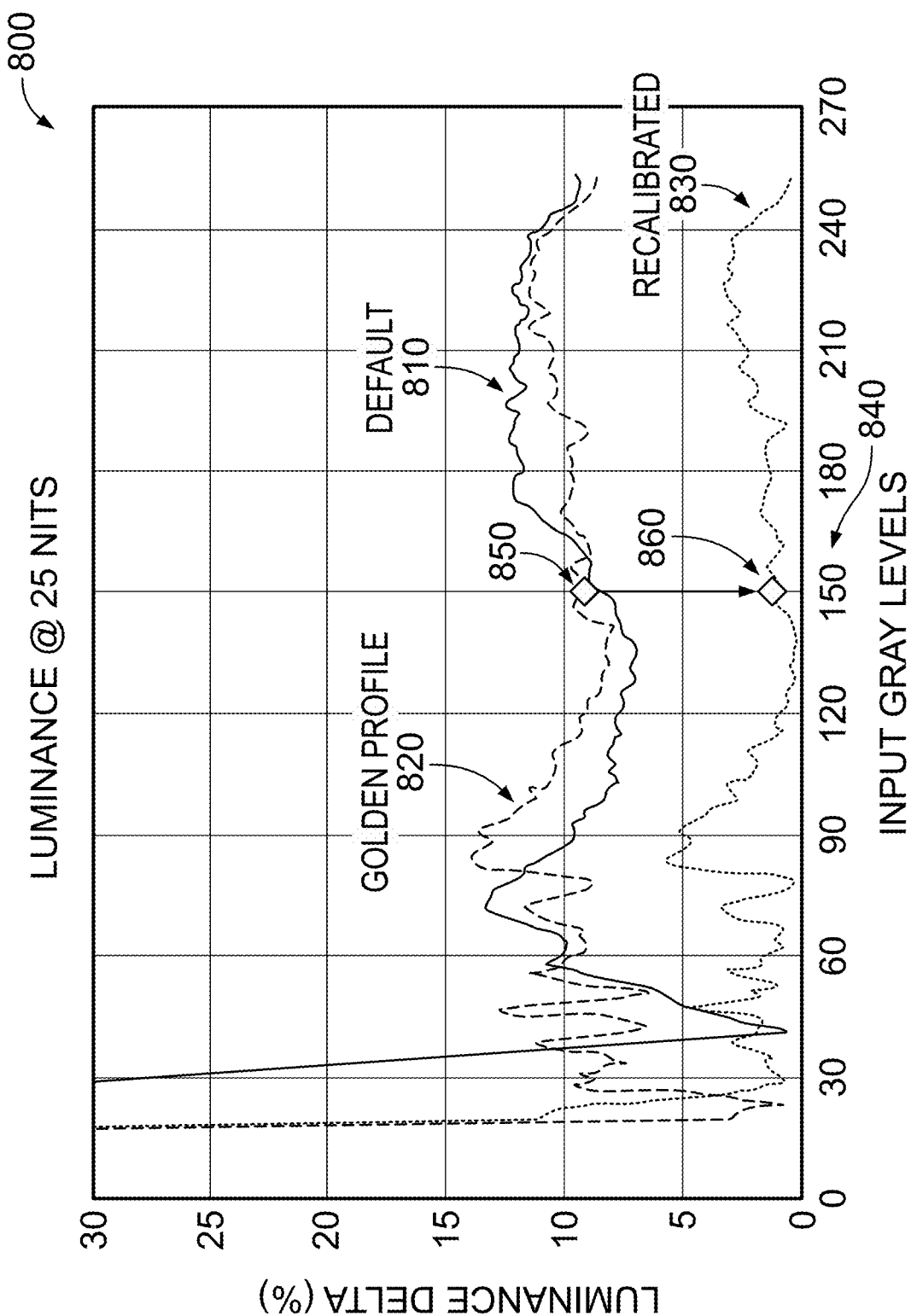
FIG. 8 depicts a graph illustrating luminance delta versus gray level, in accordance with example embodiments.

FIG. 8 depicts a graph 800 illustrating luminance delta versus gray level, in accordance with example embodiments. The horizontal axis of graph 800 displays gray levels in a range from 0 to 270 and a corresponding luminance delta percentage value is displayed along the vertical axis as a range from 0 to 30. The term "delta luminance percentage value" as used herein may be determined as:

$$\text{Luminance Delta} = \frac{\text{Luminance at } LHBM \text{ ON} - \text{Luminance at } LHBM \text{ OFF}}{\text{Luminance at } LHBM \text{ OFF}} \times 100\% \quad \text{(Eqn. 3)}$$

In some embodiments, after a gamma value offset is applied, gamma corrected luminance values for the display component at respective first and second brightness levels may be determined. For example, first and second gamma corrected luminance values of display component 110 at respective first and second brightness levels (e.g., LHBM OFF and LHBM ON modes, respectively) may be measured from computing device 100 and for each range of DBVs after a gamma correction has been applied. For example, an image can be displayed on computing device 100 for a fixed DBV band and gray level at each brightness level, and a colorimeter can capture the image and measure the respective gamma corrected luminance values. Such measured values may be utilized to determine the luminance delta based on Eqn. 3.

For consistency, the brightness value offsets are also illustrated with reference to a tap point at 25 nits. Graph 800 includes three curves: default curve 810 representing luminance delta percentage values when no compensation is applied (i.e., without a gamma value offset or a brightness value offset); golden profile curve 820 representing luminance delta percentage values when a gamma value offset has been applied (based on a regamma curve as described herein), but no brightness value offset has been applied; and a recalibrated curve 830 representing a brightness value offset that needs to be applied. Generally, minimizing luminance delta percentage values results in a reduction of optical defects.

Accordingly, for a given tap point, such as for example, 25 nits, a representative gray level may be determined such that when the golden profile curve 820 is readjusted (e.g., by shifting down vertically), the resulting luminance delta percentage values may be closer to zero. As an example, at an input gray level 840 corresponding to a value of 150, a point 850 on the golden profile curve 820 is indicated. Point 850 may be shifted down to point 860, and the luminance delta percentage value at point 850 may thus be reduced. In some embodiments, the difference in the percentage values at point 850 and point 860 may be determined as the brightness value offset to be applied. For example, the luminance delta percentage value at point 850 is approximately 10% and the luminance delta percentage value at point 860 is approximately 3%, resulting in a difference of 7%. Accordingly, brightness value offset may be determined as 93%. For example, as indicated in row 5R4 and fourth column 5C4 of table 500 in FIG. 5, the DBV offset corresponding to a tap point at 25 nits is shown as 95% of LHBM OFF. This means that for each input gray level corresponding to the DBV range in row 5R4, the brightness value corresponding to the input gray level in normal mode, or LHBM OFF mode, is reduced by 5% to obtain new brightness values at LHBM ON mode. The slight difference between 93% and 95% may be attributed to the approximate curves depicted in FIG. 8, which are for illustrative purposes only. Also, as indicated in fourth column 5C4 of table 500, DBV offsets corresponding to various tap points may be determined in a similar manner.

In some embodiments, the brightness value offset may be stored at computing device 100. In some embodiments, the storing may include storing the brightness value offset in a boot image of computing device 100. Subsequent to the storing, computing device 100 may be configured to transition, in response to a fingerprint authentication triggering event, display component 110 from the first brightness level (e.g., LHBM OFF mode) to the second brightness level (e.g., LHBM ON mode) by first applying the gamma correction, and then displaying a portion of display component 110 by applying, to the portion and for the input gray level, a value offset to a default brightness value at the second brightness level based on the brightness value offset. As described herein, the LHBM OFF mode refers to a configuration where a high brightness mode is locally applied to the fingerprint authentication region. Accordingly, the gamma value offset and the brightness value offset is applied to the portion that is different from the fingerprint authentication portion.

Figure 9:
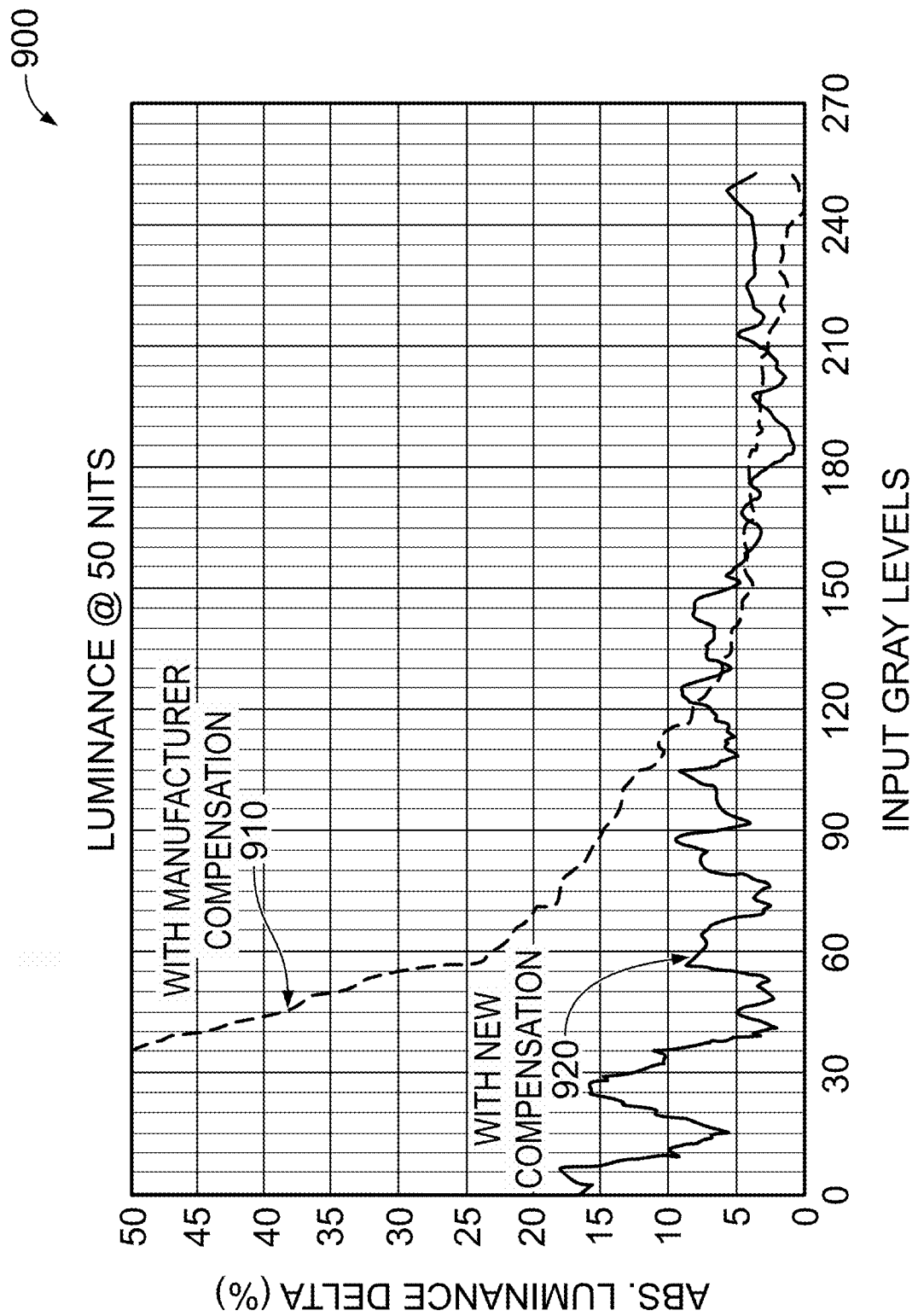
FIG. 9 depicts a graph illustrating absolute luminance delta versus gray level at an example tap point, in accordance with example embodiments.

FIG. 9 depicts a graph 900 illustrating absolute luminance delta versus gray level at an example tap point (e.g., 50 nits), in accordance with example embodiments. The horizontal axis of graph 900 displays gray levels in a range from 0 to 270 and a corresponding absolute luminance delta percentage value is displayed along the vertical axis as a range from 0 to 50. Generally, absolute luminance delta percentage values may be obtained by taking absolute values of the numerator in Eqn. 3. Graph 900 includes two curves: a first curve 910 that represents absolute luminance delta percentage values corresponding to an example compensation applied by a device manufacturer; and a second curve 920 that represents absolute luminance delta percentage values corresponding to an example new compensation as described herein, comprising a gamma value offset and a brightness value offset. As illustrated, luminance delta percentage values corresponding to second curve 920 are generally lower than luminance delta percentage values corresponding to first curve 910.

Figure 10:
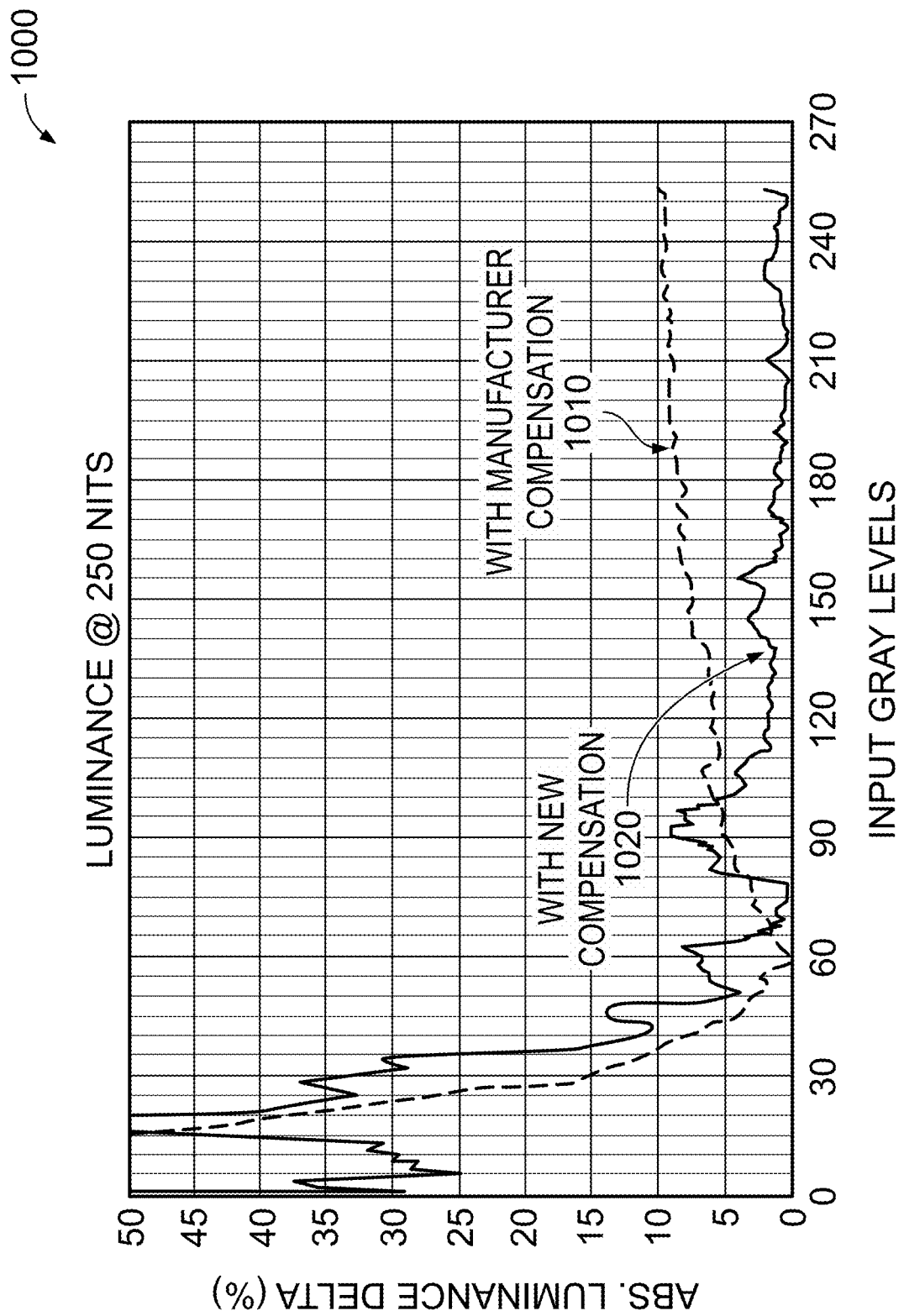
FIG. 10 depicts a graph illustrating absolute luminance delta versus gray level at another example tap point, in accordance with example embodiments.

FIG. 10 depicts a graph 1000 illustrating absolute luminance delta versus gray level at another example tap point (e.g., 250 nits), in accordance with example embodiments. The horizontal axis of graph 1000 displays gray levels in a range from 0 to 270 and a corresponding absolute luminance delta percentage value is displayed along the vertical axis as a range from 0 to 50 Graph 1000 includes two curves: a first curve 1010 that represents absolute luminance delta percentage values corresponding to an example compensation applied by a device manufacturer; and a second curve 1020 that represents absolute luminance delta percentage values corresponding to an example new compensation as described herein, comprising a gamma value offset and a brightness value offset. As illustrated, luminance delta percentage values corresponding to second curve 1020 are generally lower than luminance delta percentage values corresponding to first curve 1010.

In some embodiments, controller 170 may, after transitioning display component 110 from the first brightness level to the second brightness level, detect that the fingerprint authentication triggering event has ended, and/or a threshold time to perform the fingerprint authentication triggering event has expired. Accordingly, controller 170 may, in response to detecting that the fingerprint authentication triggering event has ended, transition display component 110 from the second brightness level to the first brightness level.

For example, in the post-authentication phase 510, controller 170 may display an unlocked screen. Also, for example, controller 170 may reset the gray level and luminance value to the settings in a pre-authentication phase.

As described herein, the luminance values may be configured at a pixel level. In some embodiments, the luminance values may be configured for a group of pixels. For example, an image may comprise different regions with different gray levels, and the luminance value may depend on such different gray levels. Generally, gray levels and luminance values, gamma value offsets, brightness value offsets, and so forth may be configured based on groups of pixels.

IV. EXAMPLE METHODS

Figure 11:
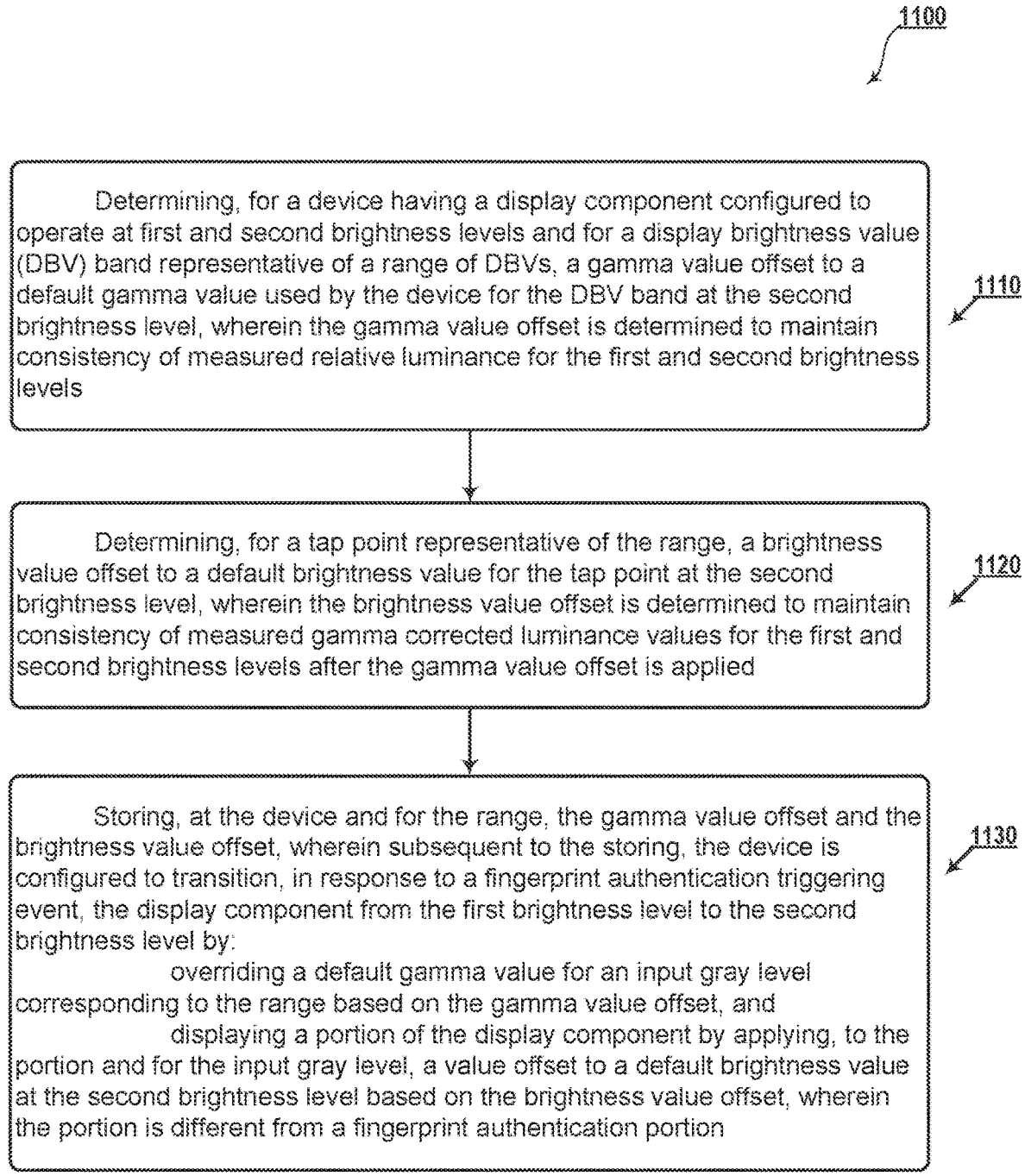
FIG. 11 illustrates a method, in accordance with example embodiments.

FIG. 11 illustrates a method 1100, in accordance with example embodiments. Method 1100 may include various blocks or steps. The blocks or steps may be carried out individually or in combination. The blocks or steps may be carried out in any order and/or in series or in parallel. Further, blocks or steps may be omitted or added to method 1100.

The blocks of method 1100 may be carried out by various elements of computing device 100 as illustrated and described in reference to FIGS. 1 and 3. Furthermore, method 1100 may utilize the relationships depicted in graphs 200, 440, 600, 800, 900, and/or 1000 and/or tables 500 and/or 700 that are illustrated and described with regard to the respective Figures.

Block 1110 includes determining, for a device having a display component configured to operate at first and second brightness levels and for a display brightness value (DBV) band representative of a range of DBVs, a gamma value offset to a default gamma value used by the device for the DBV band at the second brightness level. The gamma value offset may be determined to maintain consistency of measured relative luminance for the first and second brightness levels.

In some embodiments, the computing device is configured to operate at a first brightness level or a second brightness level. For instance, the first brightness level may be 500 nits and the second brightness level may be 900 nits. Other brightness levels may also be used with the methods described herein.

Block 1120 includes determining, for a tap point representative of the range, a brightness value offset to a default brightness value for the tap point at the second brightness level, wherein the brightness value offset is determined to maintain consistency of measured gamma corrected luminance values for the first and second brightness levels after the gamma value offset is applied.

Block 1130 includes storing, at the device and for the range, the gamma value offset, and the brightness value offset. Subsequent to the storing, the device may be configured to transition, in response to a fingerprint authentication triggering event, the display component from the first brightness level to the second brightness level by: overriding a default gamma value for an input gray level corresponding to the range based on the gamma value offset, and displaying a portion of the display component by applying, to the portion and for the input gray level, a value offset to a default brightness value at the second brightness level based on the brightness value offset, wherein the portion is different from a fingerprint authentication portion.

Some embodiments include measuring, from the device and for the range, first and second luminance values of the display component at respective first and second brightness levels to determine the measured relative luminance values for the first and second brightness levels. Such embodiments may also include measuring, from the device and for the range and after the gamma value offset is applied, gamma corrected luminance values for the display component at respective first and second brightness levels to determine the measured gamma corrected luminance values for the first and second brightness levels.

In some embodiments, the device may be configured to operate a second portion of the graphical user interface at the second brightness level, and wherein the second portion is determined based on the fingerprint authentication triggering event.

In some embodiments, the display component may be configured to operate at one or more electromagnetic pulses, and wherein the device may be configured to transition, in response to the fingerprint authentication triggering event, the display component from an initial number of electromagnetic pulses to a single electromagnetic pulse.

In some embodiments, the display brightness values may be grouped into buckets, and wherein the device may be configured with a gamma correction curve. Such embodiments include determining, for each bucket, a regamma curve based on a gamma value offset for a DBV band corresponding to the bucket. The overriding of the default gamma value for a given input gray level corresponding to a given bucket may be based on a regamma curve corresponding to the given bucket. In such embodiments, two different input gray levels in the same bucket may map to a same regamma curve. In such embodiments, two different input gray levels in the same bucket may map to a same brightness value offset. In such embodiments, the device may be configured with multiple gamma correction curves, and regamma curves corresponding to respective buckets may be determined from a same gamma correction curve. In such embodiments, the device may be configured with multiple gamma correction curves, and regamma curves corresponding to different buckets may be determined from different gamma correction curves.

In some embodiments, the storing may include storing the gamma value offset and the brightness value offset in a boot image of the device.

Figure 12:
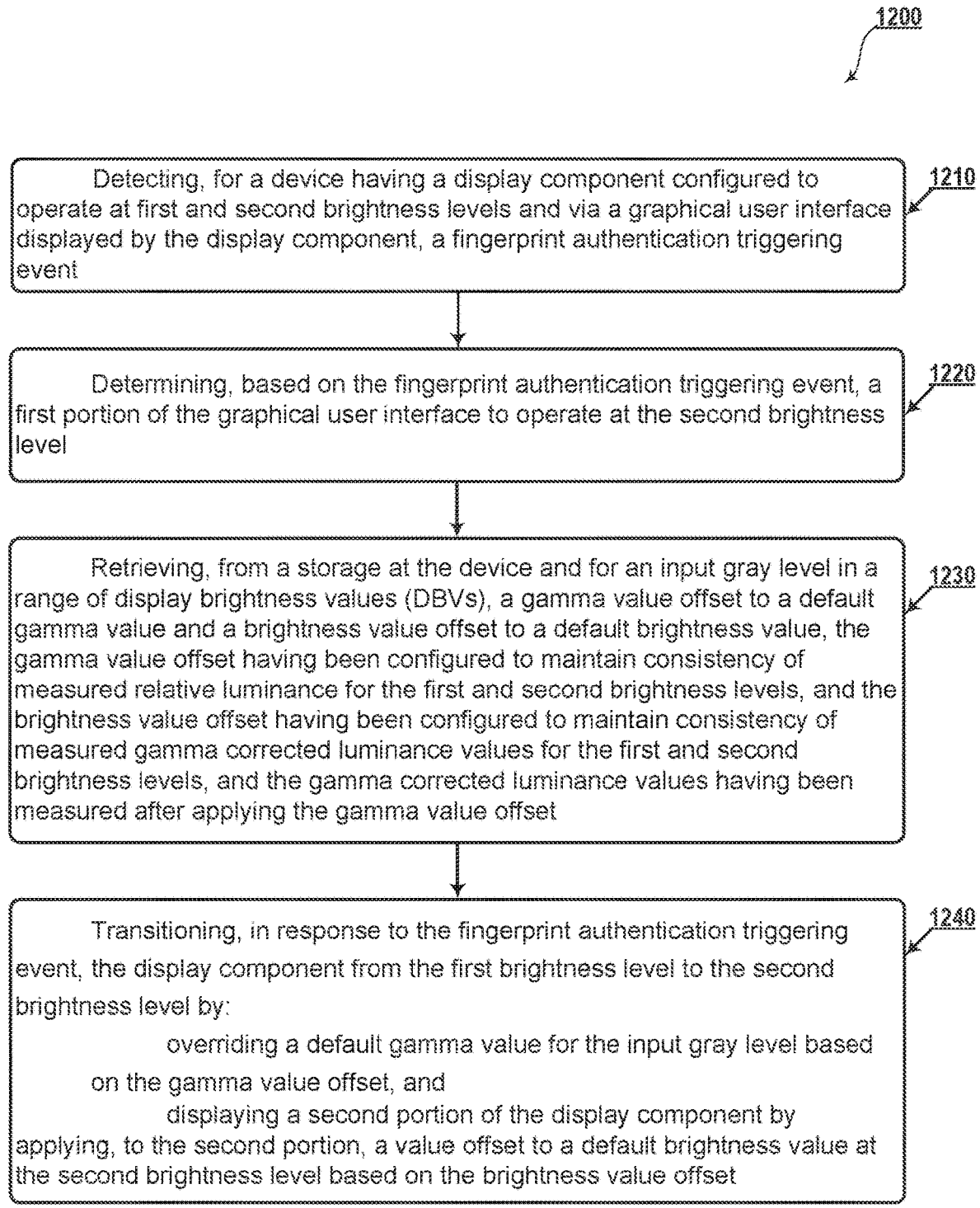
FIG. 12 illustrates another method, in accordance with example embodiments.

FIG. 12 illustrates a method 1200, in accordance with example embodiments. Method 1200 may include various blocks or steps. The blocks or steps may be carried out individually or in combination. The blocks or steps may be carried out in any order and/or in series or in parallel. Further, blocks or steps may be omitted or added to method 1200.

The blocks of method 1200 may be carried out by various elements of computing device 100 as illustrated and described in reference to FIGS. 1 and 3. Furthermore, method 1200 may utilize the relationships depicted in graphs 200, 450, 600, 800, 900, and/or 1000 and/or tables 500, and/or 700 that are illustrated and described with regard to the respective Figures.

Block 1210 includes detecting, for a device having a display component configured to operate at first and second brightness levels and via a graphical user interface displayed by the display component, a fingerprint authentication triggering event.

Block 1220 includes determining, based on the fingerprint authentication triggering event, a first portion of the graphical user interface to operate at the second brightness level.

Block 1230 includes retrieving, from a storage at the device and for an input gray level in a range of display brightness values (DBVs), a gamma value offset to a default gamma value and a brightness value offset to a default brightness value, the gamma value offset having been configured to maintain consistency of measured relative luminance for the first and second brightness levels, and the brightness value offset having been configured to maintain consistency of measured gamma corrected luminance values for the first and second brightness levels, and the gamma corrected luminance values having been measured after applying the gamma value offset.

Block 1240 includes transitioning, in response to the fingerprint authentication triggering event, the display component from the first brightness level to the second brightness level by: overriding a default gamma value for the input gray level based on the gamma value offset, and displaying a second portion of the display component by applying, to the second portion, a value offset to a default brightness value at the second brightness level based on the brightness value offset.

In some embodiments, the display component may be configured to operate at one or more electromagnetic pulses. Such embodiments may include transitioning the display component from the first brightness level and an initial number of electromagnetic pulses to the second brightness level with a single electromagnetic pulse.

After transitioning the display component from the first brightness level to the second brightness level, some embodiments may include detecting that the fingerprint authentication triggering event has ended. In response to detecting that the fingerprint authentication triggering event has ended, such embodiments may include transitioning the display component from the second brightness level to the first brightness level. Some embodiments may include detecting that the fingerprint authentication triggering event has ended by determining that a fingerprint detection has been performed. Such embodiments may include detecting that the fingerprint authentication triggering event has ended by determining that a threshold time to perform a fingerprint detection has expired.

In some embodiments, the second brightness level may be at least 800 nits. In some embodiments, the first brightness level may range from 0 to 500 nits.

In some embodiments, the display component may include a plurality of color channels, wherein the default gamma value may include respective register values for the plurality of color channels, and wherein the gamma value offset may include an offset to at least one of the register values of the default gamma value. In such embodiments, the plurality of color channels may include red, green, and blue (RGB) color channels.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods. Thus, the computer readable media may include secondary or persistent long-term storage, like read only memory (ROM), optical or magnetic disks, compact disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A computer-implemented method comprising:
   determining, for a device having a display component configured to operate at first and second brightness levels and for a display brightness value (DBV) band representative of a range of DBVs, a gamma value offset to a default gamma value used by the device for the DBV band at the second brightness level, wherein the gamma value offset is determined to maintain consistency of measured relative luminance for the first and second brightness levels;
   determining, for a tap point representative of the range, a brightness value offset to a default brightness value for the tap point at the second brightness level, wherein the brightness value offset is determined to maintain consistency of measured gamma corrected luminance values for the first and second brightness levels after the gamma value offset is applied; and
   storing, at the device and for the range, the gamma value offset and the brightness value offset, wherein subsequent to the storing, the device is configured to transition, in response to a fingerprint authentication triggering event, the display component from the first brightness level to the second brightness level by:
   overriding a default gamma value for an input gray level corresponding to the range based on the gamma value offset, and
   displaying a portion of the display component by applying, to the portion and for the input gray level, a value offset to a default brightness value at the second brightness level based on the brightness value offset, wherein the portion is different from a fingerprint authentication portion.

2. The method of claim 1, further comprising:
   measuring, from the device and for the range, first and second luminance values of the display component at respective first and second brightness levels to determine the measured relative luminance values for the first and second brightness levels; and
   measuring, from the device and for the range and after the gamma value offset is applied, gamma corrected luminance values for the display component at respective first and second brightness levels to determine the measured gamma corrected luminance values for the first and second brightness levels.

3. The method of claim 1, wherein the device is configured to operate a second portion of the display component at the second brightness level, and wherein the second portion is determined based on the fingerprint authentication triggering event.

4. The method of claim 1, wherein the display component is configured to operate at one or more electromagnetic pulses, and wherein the device is configured to transition, in response to the fingerprint authentication triggering event, the display component from an initial number of electromagnetic pulses to a single electromagnetic pulse.

5. The method of claim 1, wherein the display brightness values are grouped into buckets, and wherein the device is configured with a gamma correction curve, the method further comprises:
determining, for each bucket, a regamma curve based on a gamma value offset for a DBV band corresponding to the bucket, and
wherein the overriding of the default gamma value for a given input gray level corresponding to a given bucket is based on a regamma curve corresponding to the given bucket.

6. The method of claim 5, wherein two different input gray levels in the same bucket map to a same regamma curve.

7. The method of claim 5, wherein two different input gray levels in the same bucket map to a same brightness value offset.

8. The method of claim 5, wherein the device is configured with multiple gamma correction curves, and regamma curves corresponding to respective buckets are determined from a same gamma correction curve.

9. The method of claim 5, wherein the device is configured with multiple gamma correction curves, and regamma curves corresponding to different buckets are determined from different gamma correction curves.

10. The method of claim 1, wherein the storing comprises storing the gamma value offset and the brightness value offset in a boot image of the device.

11. A computer-implemented method, comprising:
detecting, for a device having a display component configured to operate at first and second brightness levels and via a graphical user interface displayed by the display component, a fingerprint authentication triggering event;
determining, based on the fingerprint authentication triggering event, a first portion of the graphical user interface to operate at the second brightness level;
retrieving, from a storage at the device and for an input gray level in a range of display brightness values (DBVs), a gamma value offset to a default gamma value and a brightness value offset to a default brightness value, the gamma value offset having been configured to maintain consistency of measured relative luminance for the first and second brightness levels, and the brightness value offset having been configured to maintain consistency of measured gamma corrected luminance values for the first and second brightness levels, and the gamma corrected luminance values having been measured after applying the gamma value offset;
transitioning, in response to the fingerprint authentication triggering event, the display component from the first brightness level to the second brightness level by:
overriding a default gamma value for the input gray level based on the gamma value offset, and
displaying a second portion of the display component by applying, to the second portion, a value offset to a default brightness value at the second brightness level based on the brightness value offset.

12. The computer-implemented method of claim 11, wherein the display component is configured to operate at one or more electromagnetic pulses, and wherein the transitioning of the display component further comprises:
transitioning the display component from the first brightness level and an initial number of electromagnetic pulses to the second brightness level with a single electromagnetic pulse.

13. The computer-implemented method of claim 11, further comprising:
after transitioning the display component from the first brightness level to the second brightness level, detecting that the fingerprint authentication triggering event has ended; and
in response to detecting that the fingerprint authentication triggering event has ended, transitioning the display component from the second brightness level to the first brightness level.

14. The computer-implemented method of claim 13, further comprising:
detecting that the fingerprint authentication triggering event has ended by determining that a fingerprint detection has been performed.

15. The computer-implemented method of claim 14, further comprising:
detecting that the fingerprint authentication triggering event has ended by determining that a threshold time to perform a fingerprint detection has expired.

16. The computer-implemented method of claim 11, wherein the second brightness level is at least 800 nits.

17. The computer-implemented method of claim 11, wherein the first brightness level ranges from 0 to 500 nits.

18. The computer-implemented method of claim 11, wherein the display component has a plurality of color channels, wherein the default gamma value comprises respective register values for the plurality of color channels, and wherein the gamma value offset comprises an offset to at least one of the register values of the default gamma value.

19. The computer-implemented method of claim 18, wherein the plurality of color channels comprise red, green, and blue (RGB) color channels.

20. A system comprising:
one or more processors; and
data storage, wherein the data storage has stored thereon computer-executable instructions that, when executed by the one or more processors, cause the system to carry out operations comprising:
determining, for a device having a display component configured to operate at first and second brightness levels and for a display brightness value (DBV) band representative of a range of DBVs, a gamma value offset to a default gamma value used by the device for the DBV band at the second brightness level, wherein the gamma value offset is determined to maintain consistency of measured relative luminance for the first and second brightness levels;
determining, for a tap point representative of the range, a brightness value offset to a default brightness value for the tap point at the second brightness level, wherein the brightness value offset is determined to maintain consistency of measured gamma corrected luminance values for the first and second brightness levels after the gamma value offset is applied; and storing, at the device and for the range, the gamma value offset and the brightness value offset, wherein subsequent to the storing, the device is configured to transition, in response to a fingerprint authentication triggering event, the display component from the first brightness level to the second brightness level by:

overriding a default gamma value for an input gray level corresponding to the range based on the gamma value offset, and displaying a portion of the display component by applying, to the portion and for the input gray level, a value offset to a default brightness value at the second brightness level based on the brightness value offset.

* * * * *